US009646212B2

(12) United States Patent
Zhang et al.

(10) Patent No.: US 9,646,212 B2
(45) Date of Patent: *May 9, 2017

(54) METHODS, DEVICES AND SYSTEMS FOR DETECTING OBJECTS IN A VIDEO

(71) Applicant: Avigilon Fortress Corporation, Vancouver (CA)

(72) Inventors: Zhong Zhang, Great Falls, VA (US); Weihong Yin, Great Falls, VA (US); Peter Venetianer, McLean, VA (US)

(73) Assignee: AVIGILON FORTRESS CORPORATION, Vancouver, British Columbia (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/247,986

(22) Filed: Aug. 26, 2016

(65) Prior Publication Data

US 2016/0379061 A1 Dec. 29, 2016

Related U.S. Application Data

(63) Continuation of application No. 14/634,838, filed on Mar. 1, 2015, now Pat. No. 9,443,143, which is a continuation of application No. 13/838,511, filed on Mar. 15, 2013, now Pat. No. 9,165,190.

(60) Provisional application No. 61/700,033, filed on Sep. 12, 2012.

(51) Int. Cl.
G06K 9/00 (2006.01)
G06T 7/73 (2017.01)
G06T 7/00 (2017.01)
H04N 7/18 (2006.01)

(52) U.S. Cl.
CPC ...... *G06K 9/00778* (2013.01); *G06K 9/00369* (2013.01); *G06K 9/00624* (2013.01); *G06K 9/00771* (2013.01); *G06K 9/00785* (2013.01); *G06T 7/0042* (2013.01); *G06T 7/0087* (2013.01); *G06T 7/75* (2017.01); *G06T 2207/10016* (2013.01); *G06T 2207/20076* (2013.01); *G06T 2207/20144* (2013.01);
(Continued)

(58) Field of Classification Search
USPC ........ 382/100, 103, 106–107, 117–118, 154, 382/162, 168, 173, 181, 189–199, 209, 382/219, 232, 254, 274, 276, 291, 305, 382/312; 348/143, 142, 154, 159, 86
See application file for complete search history.

(56) References Cited

U.S. PATENT DOCUMENTS 7,801,330 B2 9/2010 Zhang et al.
7,825,954 B2 11/2010 Zhang et al.
7,868,912 B2 1/2011 Venetianer et al.
(Continued)

OTHER PUBLICATIONS

Saad et al., "Florr Fields for Tracking in High Density Crowd Scenes." ECC, 2008.
(Continued)

*Primary Examiner* — Seyed Azarian
(74) *Attorney, Agent, or Firm* — Muir Patent Law, PLLC

(57) ABSTRACT

Methods, devices and systems for performing video content analysis to detect humans or other objects of interest a video image is disclosed. The detection of humans may be used to count a number of humans, to determine a location of each human and/or perform crowd analyses of monitored areas.

38 Claims, 26 Drawing Sheets

(52) U.S. Cl.
CPC ............... *G06T 2207/30196* (2013.01); *G06T 2207/30232* (2013.01)

(56) References Cited

U.S. PATENT DOCUMENTS

| | | | |
|---|---|---|---|
| 7,932,923 | B2 | 4/2011 | Lipton et al. |
| 8,358,806 | B2* | 1/2013 | Dong .................. G06K 9/00369 382/103 |
| 8,630,455 | B2 | 1/2014 | Ran |
| 2002/0050924 | A1 | 5/2002 | Mahbub |
| 2005/0105765 | A1 | 5/2005 | Han et al. |
| 2007/0058836 | A1 | 3/2007 | Boregowda et al. |
| 2008/0100704 | A1* | 5/2008 | Venetianer .......... G06F 17/3079 348/143 |
| 2008/0106599 | A1 | 5/2008 | Liu et al. |
| 2008/0118106 | A1* | 5/2008 | Kilambi ................. G06M 11/00 382/103 |
| 2008/0181453 | A1 | 7/2008 | Xu et al. |
| 2009/0041297 | A1* | 2/2009 | Zhang ................ G06K 9/00362 382/103 |
| 2009/0222388 | A1 | 9/2009 | Hua et al. |
| 2011/0050878 | A1* | 3/2011 | Wells ..................... H04N 7/181 348/86 |
| 2011/0268320 | A1 | 11/2011 | Huang et al. |
| 2012/0027299 | A1 | 2/2012 | Ran |

OTHER PUBLICATIONS

Rodriguez et al., "Data-driven Crowd Analysis in Videos." ICCV, 2011.
Cho et al., "A Neural-Based Crowd Estimation by Hybrid Global Learning Algorithm." IEEE Transactions on Systems, Man, and Cybernetics—Part B: Cybernetics, vol. 29, No. 4, August 1999.
Kong et al., "A Viewpoint Invariant Approach for Crowd Counting." ICPR, 2006.
Hou et al., "Automated People Counting at a Mass Site." Proceedings of the IEEE International Conference on Automation and Logistics Qingdao, China Sep. 2008.
Rahmalan et al., "On Crowd Density Estimation for Surveillance." 2006.
Albiol et al., "Video Analysis Using Corner Motion Statistics." PETS, 2009.
Conte et al., "Counting Moving People in Videos by Salient Points Detection." 2010 International Conference on Pattern Recognition, 2010.
Brostow et al., "Unsupervised Bayesian Detection of Independent Motion in Crowds." CVPR, 2006.
Wu et al., "Crowd Density Estimation Using Texture Analysis and Learning." Bulletin of Advanced Technology Research, vol. 3 No. 5, May 2009.
Fehr et al., "Counting People in Groups." AVSS, 2009.
Zhao et al., "Tracking Multiple Humans in Complex Situations" IEEE Transactions on Pattern Analysis and Machine Intelligence, vol. 26, No. 9, September 2004.
Dalal et al., "Histograms of Oriented Gradients for Human Detection." CVPR, 2005.
Mikolajczyk et al., "Human Detection Based on a Probabilistic Assembly of Robust Part Detectors." ECCV 2004, LNCS 3021, pp. 69-82, 2004.
Zhao et al., "Segmentation and Tracking of Multiple Humans in Crowded Environments," IEEE Transactions on Pattern Analysis and Machine Intelligence, 2007.
Li et al., "Estimating the Number of People in Crowded Scenes by MID Based Foreground Segmentation and Head-shoulder Detection." ICPR 2008, vol. 12, 2008.
Mohan et al., "Example Based Object Detection in Images by Components." PAMI, 2001.
Liu et al., "Detecting and Counting People in Surveillance Applications." AVSS, 2005.
Rittscher et al. "Simultaneous Estimation of Segmentation and Shape." CVPR, 2005.
Zhang et al., "A Robust Human Detection and Tracking System Using a Human-Model-Based Camera Calibration." ECCV, 2008.
Search Report for International Application PCT/US/13/59471 dated Apr. 8, 2014.
Kilambi et al.: "Estimating pedestrian counts in groups," Computer Vision and Image Understanding 110 (2008), pp. 43-59, Mar. 13, 2008.
Zhong Zhang et al.: "Fast Crowd Density Estimation in Surveillance Videos without Training," Advanced Video and Signal Based Surveillance (AVSS), 2012 IEEE Ninth International Conference on Advanced Video and Signal-Based Surveillance, pp. 452-457, Sep. 18, 2012.

* cited by examiner

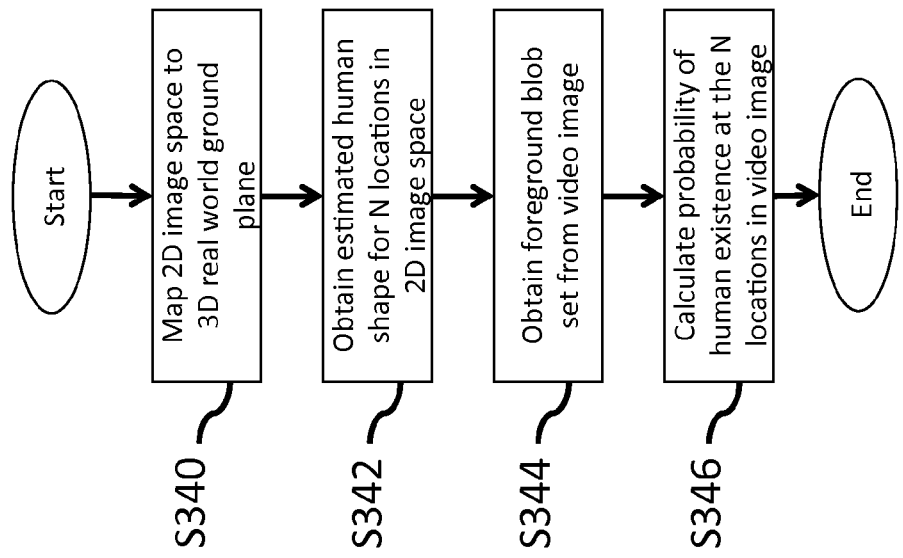

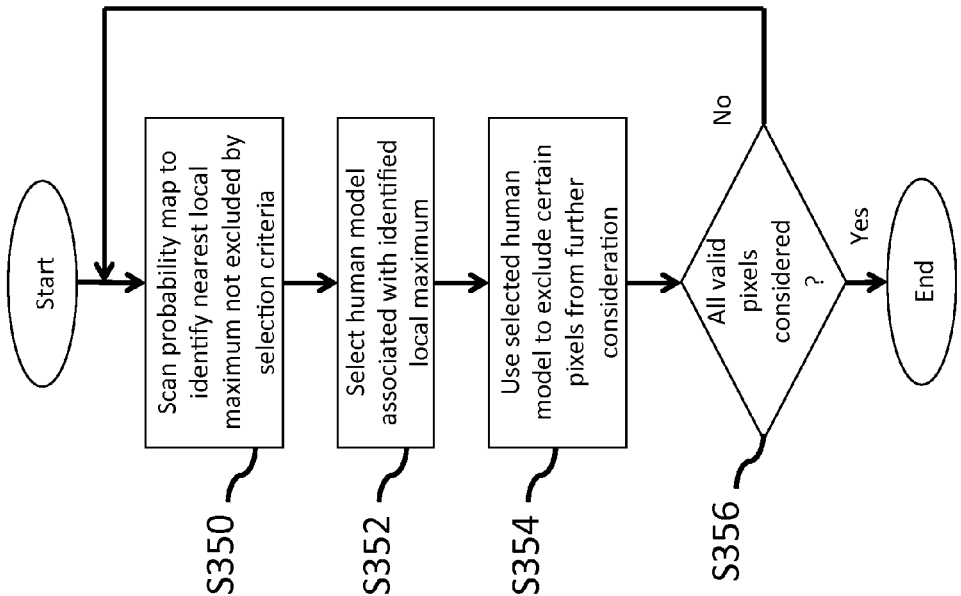

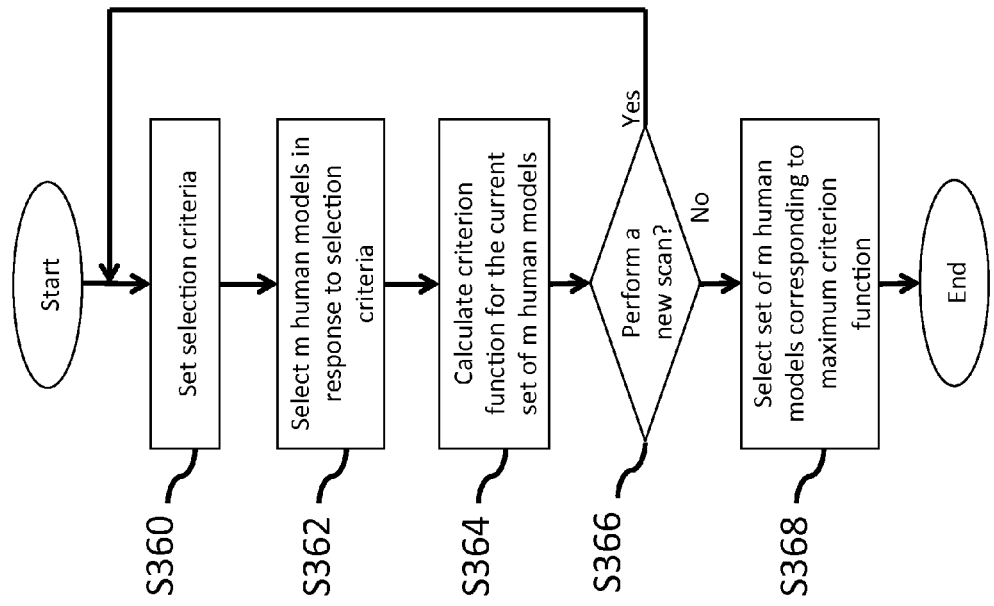

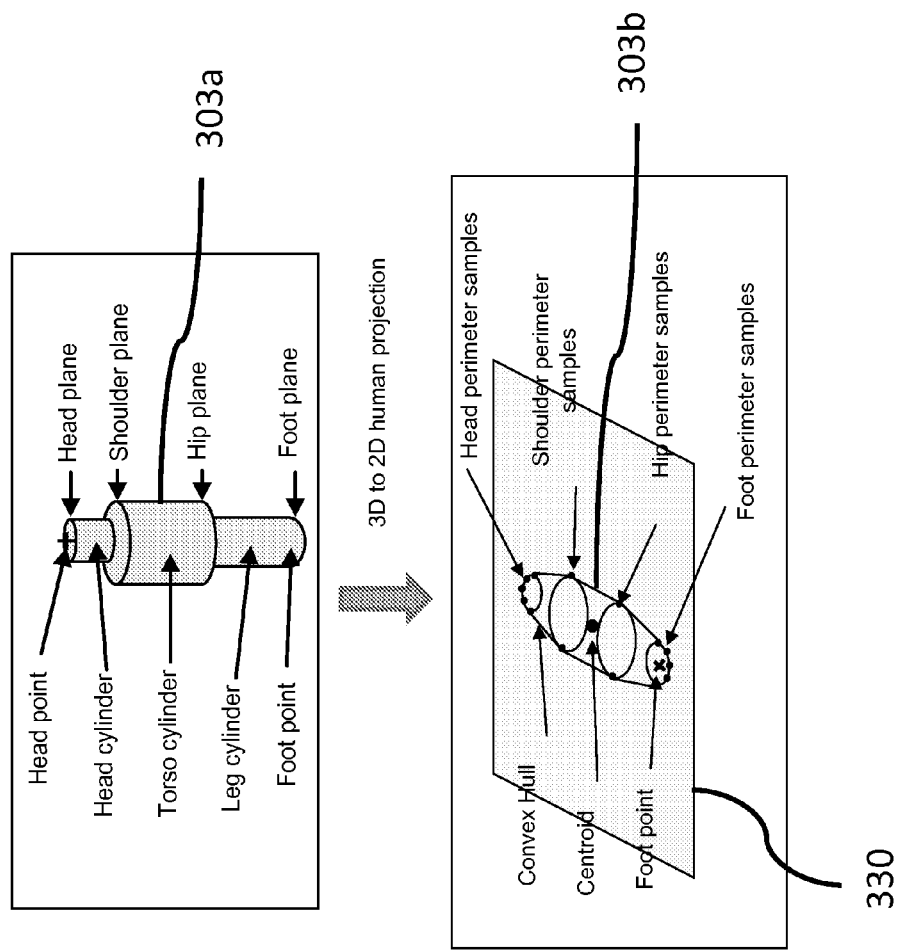

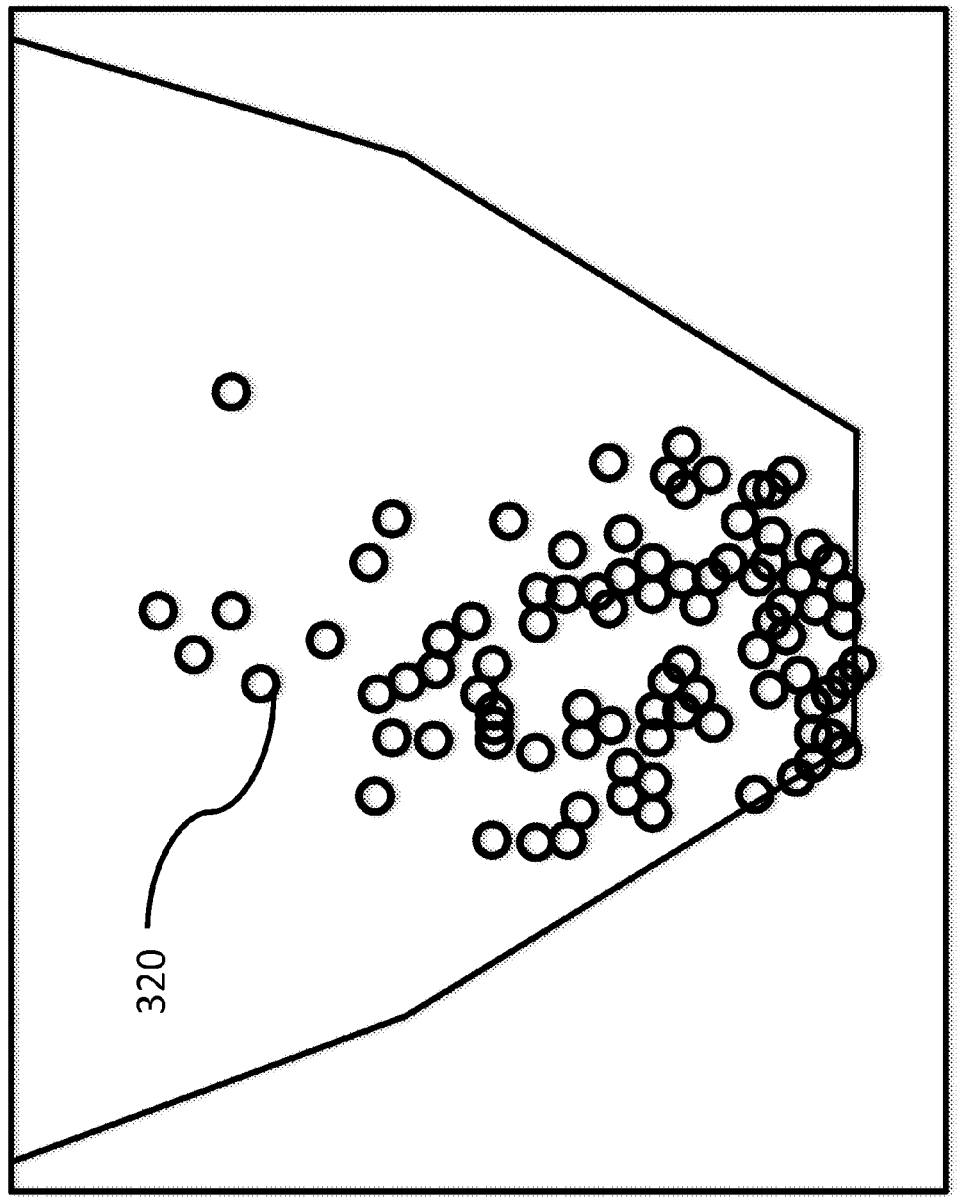

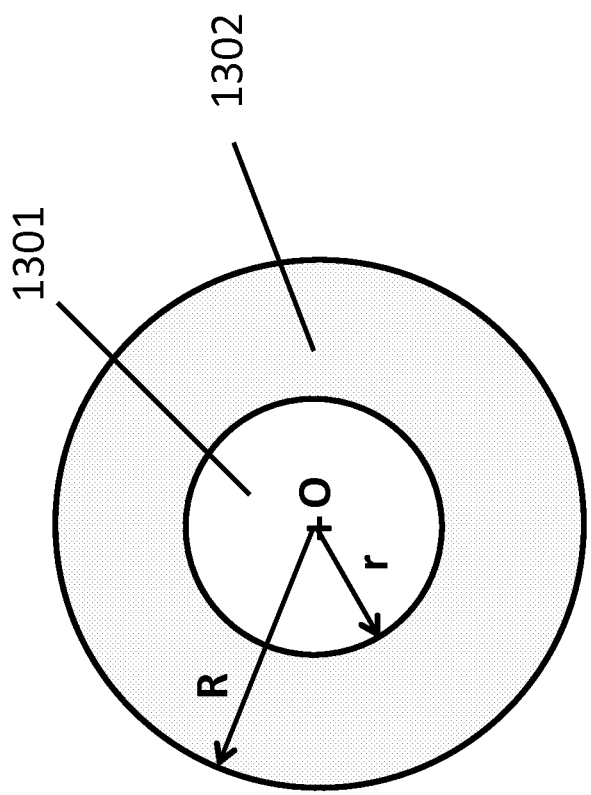

METHODS, DEVICES AND SYSTEMS FOR DETECTING OBJECTS IN A VIDEO

CROSS-REFERENCE TO RELATED APPLICATION

This application is a continuation application of and claims priority to U.S. patent application Ser. No. 14/634,838 filed on Mar. 1, 2015 which is a continuation application of and claims priority to U.S. patent application Ser. No. 13/838,511 filed on Mar. 15, 2013, which claims the benefit of priority to U.S. Provisional Patent Application No. 61/700,034, filed Sep. 12, 2012, the contents of each of which are incorporated herein by reference in its entirety.

BACKGROUND

1. Field

This disclosure relates to video surveillance, such as video surveillance methods and systems and video verification methods and systems. Video surveillance systems, devices and methods are disclosed that may detect humans. Video surveillance systems, devices and methods may count humans and/or monitor human crowd scenarios in video streams.

2. Background

Intelligent Video Surveillance (IVS) system may be used to detect events of interest in video feeds in real-time or offline (e.g., by reviewing previously recorded and stored video). Typically this task is accomplished by detecting and tracking targets of interest. This usually works well when the scene is not crowded. However, the performance of such a system may drop significantly in crowded scenes. In reality, such crowded scenes occur frequently, thus, being able to detect humans in crowds is of great interest. Such detection of humans may be used for counting and other crowd analyses, such as crowd density, crowd formation and crowd dispersion.

Previous crowd analysis work addresses some specific extremely crowded scenarios like certain sport or religious events. However, there is a need to also focus on more common surveillance scenarios where large crowds may form occasionally. These include public places such as streets, shopping centers, airports, bus and train stations, etc.

Recently, the problem of crowd density estimation or counting people in crowd is gaining significant attentions in research community as well as from industry. The existing approaches mainly include map-based (indirect) approaches and/or a detection-based (direct) approaches.

A map-based approach may attempt to map the number of human targets to extracted image features, such as the amount of motion pixels, the foreground blob size, foreground edges, group of foreground corners, and other image features. The map-based approach usually requires training for different types of video scenarios. The research is mainly focused on looking for reliable features that correspond well with the people count and on how to deal with some special issues such as shadows and camera view perspective. Under many scenarios, the map-based approach may provide fairly accurate human count estimates given enough training videos. However, the performance is usually scene dependent, and the actual locations of each individual may be unavailable.

A detection-based approach may count the number of people in the scene by identifying each individual human target. The research has been focused on human detection, human parts detection and joint-consideration of detection and tracking. These approaches may provide more accurate detection and counting in lightly crowded scenarios. If the location of each individual can be made available, it may be possible to compute local crowd density. The key challenges of these approaches are higher computational cost, viewpoint dependent learning and relatively large human image size requirement.

The embodiments described here address some of these problems of existing systems.

SUMMARY

The disclosed embodiments provide methods, devices and systems for intelligent analysis of video images to detect objects, such as human objects.

In certain embodiments, a method of detecting human objects in a video comprises determining that certain pixels of a video image are foreground pixels, the group of foreground pixels constituting a foreground blob set of one or more foreground blobs; for each of N locations within the video image, where N is an integer, comparing a predetermined shape with the foreground blob set to obtain a corresponding probability of a human at the location, thereby obtaining N probabilities corresponding to the N locations; and using the N probabilities, determining X humans are represented by the foreground blob set, where X is whole number.

A method of detecting human objects in a video, may comprise determining pixels of a video image of a real world scene are foreground pixels, the group of foreground pixels constituting a foreground blob set of one or more foreground blobs; and for each of N locations within the video image, where N is an integer, comparing a predetermined shape with the foreground blob set to determine X humans are represented by the foreground blob set, where X is whole number.

Methods may include determining a location of each of the X humans. The locations of each of the X humans may be determined as a location within a horizontal plane of the real world, such as a location on a physical ground plane of the real world.

The detection of the human objects may be used to count humans, for crowd analyses and for other event detections.

System and devices are disclosed which may be configured to perform such methods.

Computer readable media containing software that may be used to configure a computer to perform the operations described herein and comprise further embodiments of the invention.

BRIEF DESCRIPTION OF THE DRAWINGS

Example embodiments will be more clearly understood from the following detailed description taken in conjunction with the accompanying drawings. The figures represent non-limiting example embodiments as described herein.

FIG. 3D illustrates an exemplary method for calculating a human probability map.

FIG. 3E illustrates an exemplary method of performing a single pass of the probability map as part of finding a best number of human models within a video image.

FIG. 3F illustrates a method of performing plural passes of the probability map as to find the best number of human models within a video image.

FIG. 4 illustrates a generic human model that includes a 3D cylinder model and its corresponding 2D convex hull model.

FIGS. 7A, 7B and 7C illustrate an example of regarding human crowd density based on the human detection results.

FIG. 13 illustrates one example of defining of a crowd gathering spot.

DETAILED DESCRIPTION

Figure 1:
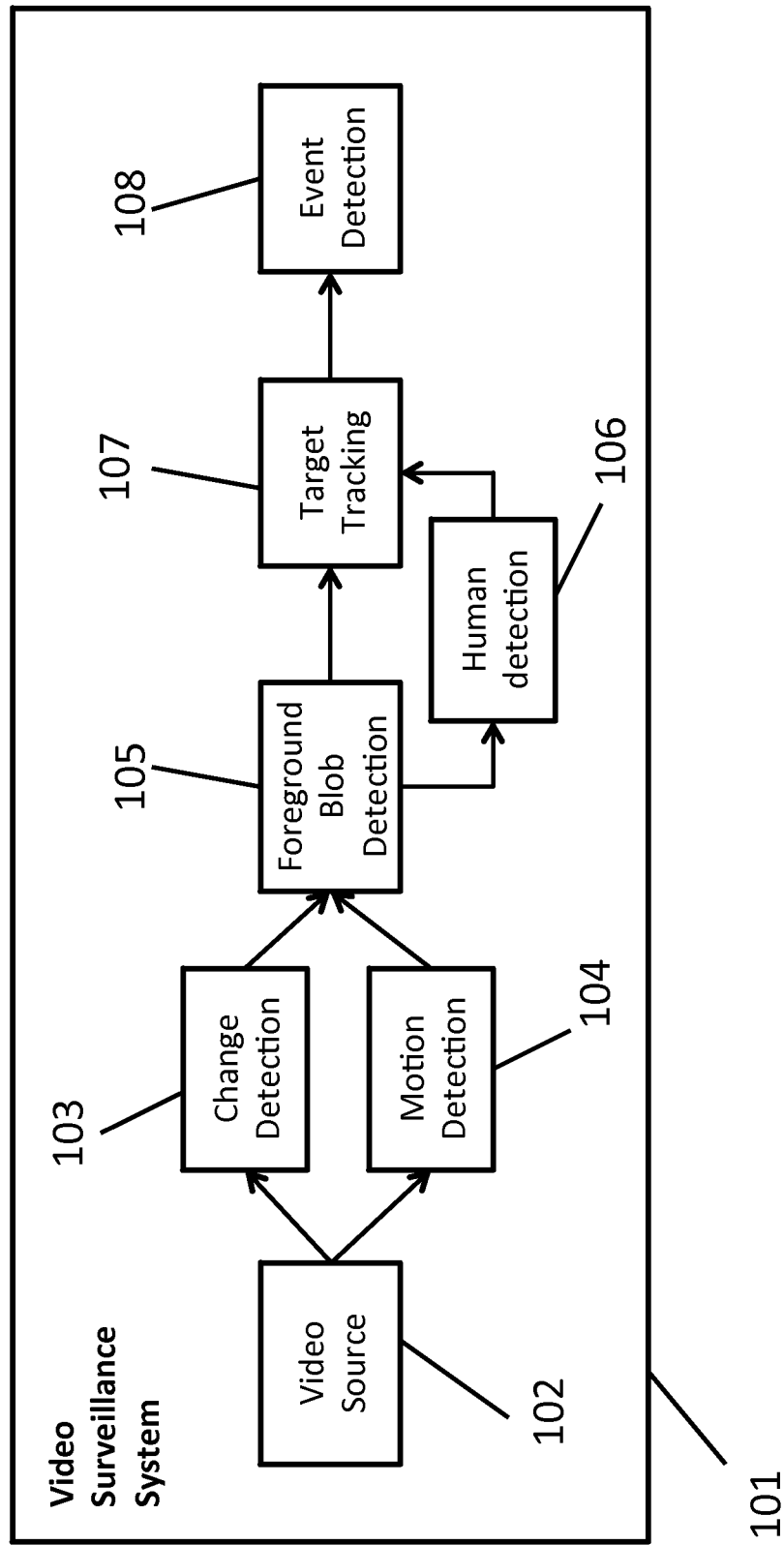
FIG. 1 illustrates an exemplary video surveillance system according to an exemplary embodiment of the invention.

Various exemplary embodiments will be described more fully hereinafter with reference to the accompanying drawings, in which some exemplary embodiments are shown. The present invention may, however, be embodied in many different forms and should not be construed as limited to the example embodiments set forth herein. These example embodiments are just that—examples—and many implementations and variations are possible that do not require the details provided herein. It should also be emphasized that the disclosure provides details of alternative examples, but such listing of alternatives is not exhaustive. Furthermore, any consistency of detail between various examples should not be interpreted as requiring such detail—it is impracticable to list every possible variation for every feature described herein. The language of the claims should be referenced in determining the requirements of the invention. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular exemplary embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

DEFINITIONS

In describing the invention, the following definitions are applicable throughout (including above).

"Video" may refer to motion pictures represented in analog and/or digital form. Examples of video may include: television; a movie; an image sequence from a video camera or other observer; an image sequence from a live feed; a computer-generated image sequence; an image sequence from a computer graphics engine; an image sequence from a storage device, such as a computer-readable medium, a digital video disk (DVD), or a high-definition disk (HDD); an image sequence from an IEEE 1394-based interface; an image sequence from a video digitizer; or an image sequence from a network.

A "video sequence" may refer to some or all of a video.

A "video camera" may refer to an apparatus for visual recording. Examples of a video camera may include one or more of the following: a video imager and lens apparatus; a video camera; a digital video camera; a color camera; a monochrome camera; a camera; a camcorder; a PC camera; a webcam; an infrared (IR) video camera; a low-light video camera; a thermal video camera; a closed-circuit television (CCTV) camera; a pan, tilt, zoom (PTZ) camera; and a video sensing device. A video camera may be positioned to perform surveillance of an area of interest.

"Video processing" may refer to any manipulation and/or analysis of video, including, for example, compression, editing, surveillance, and/or verification.

A "frame" may refer to a particular image or other discrete unit within a video.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer: a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, or a chip set; a system on a chip (SoC), or a multiprocessor system-on-chip (MPSoC); an optical computer; a quantum computer; a biological computer; and an apparatus that may accept data, may process data in accordance with one or more stored software programs, may generate results, and typically may include input, output, storage, arithmetic, logic, and control units.

"Software" may refer to prescribed rules to operate a computer. Examples of software may include: software; code segments; instructions; applets: pre-compiled code; compiled code; interpreted code; computer programs; and programmed logic.

A "computer-readable medium" may refer to any storage device used for storing data accessible by a computer. Examples of a computer-readable medium may include: a magnetic hard disk; a floppy disk; an optical disk, such as a CD-ROM and a DVD: a magnetic tape; a flash removable memory; a memory chip; and/or other types of media that can store machine-readable instructions thereon.

A "computer system" may refer to a system having one or more computers, where each computer may include a computer-readable medium embodying software to operate the computer. Examples of a computer system may include: a distributed computer system for processing information via computer systems linked by a network; two or more computer systems connected together via a network for transmitting and/or receiving information between the computer systems; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet. Exemplary networks may operate with any of a number of protocols, such as Internet protocol (IP), asynchronous transfer mode (ATM), and/or synchronous optical network (SONET), user datagram protocol (UDP), IEEE 802.x, etc.

In some embodiments, a crowd density estimation method, system and device may be based on existing video content analysis methods, systems and devices. Besides the basic estimation accuracy requirement, the approach may include one or more of the following:

Camera view independence may allow embodiments to work on a wide range of application scenarios regardless of variations in camera location, view angle, number of pixels on target, etc.

Relatively low computational cost that may run in real-time. The embodiments may be implemented on an embedded system.

Complex initial set up and training may be reduced and/or eliminated, allowing more convenience and a lower cost of ownership.

Some examples disclosed herein include a detection-based approach and no training may be required. The examples may be implemented with a general IVS system, which already performs basic detection and tracking tasks and provides a reliable foreground mask. A convex region human image model may be computed for every image pixel, which may be used to estimate the number of human targets in each foreground region. Camera calibration data may provide the mapping from the image plane to the ground plane in physical world, which may be used to provide actual crowd density measurements in areas within the camera view. Using the actual crowd density measurement(s), other events of interest may be detected, for example, "crowd hot spot", "crowd gathering", "crowd dispersing", etc.

FIG. 1 illustrates a video surveillance system 101 according to exemplary embodiments of the invention. The video surveillance system may be configured to detect and monitor human crowd activities in video streams. The video surveillance system 101 may be used in a variety of applications where human detection is of interest, such as use for crowd density analyses. For example, the embodiments may be used for suspicious people gathering detection, pedestrian traffic statistic collection, abnormal crowd formation and/or dispersion, etc. The video surveillance system 101 may include a video source 102 (e.g., a video camera or memory, such as a hard drive, with stored video), a change detection module 103, a motion detection module 104, a foreground blob detection module 105, a human detection module 106, a target tracking module 107 and an event detection module 108. In this example, the video source (e.g., video camera) is stationary. However, one of ordinary skill will recognize the invention also applies to mobile video sources. In this example, the video source provides a single video stream. However, the invention also contemplates use of and processing of multiple video streams.

The video surveillance system may be implemented with a typical stationary platform IVS system. By way of example, see U.S. Pat. No. 7,868,912 issued to Venetianer et al. and U.S. Pat. No. 7,932,923 issued to Lipton et al., both of which are incorporated herein by reference in their entirety, for exemplary details of an IVS system which may be used to implement the embodiments described here. U.S. Pat. No. 7,868,912 and U.S. Pat. No. 7,932,923 are also incorporated by reference for exemplary details of video primitive (or metadata) generation and downstream processing (which may be real time processing or later processing) to obtain information from the video, such as event detection, using the generated video primitives, which may be used with the embodiments disclosed herein. Each module 103-108, as well as their individual components, alone or as combined with other modules/components, may be implemented by dedicated hardware (circuitry), software and/or firmware. For example, a general purpose computer programmed with software may implement all of the modules. As such, computer readable media containing software that may be used to configure a computer to perform the operations described herein comprise further embodiments of the invention. As another example, to implement the systems, devices and methods described herein, various computing and optical components may be used, such as one or more of the following: a general purpose computer, supercomputer, a mainframe; a super mini-computer, a mini-computer; a workstation; a micro-computer; a server; an interactive television; a hybrid combination of a computer and an interactive television; a smart phone; a tablet; and application-specific hardware to emulate a computer and/or software. These may include one or more processors, one of more field programmable gate arrays (FPGAs), computer memory, a computer-readable medium such as, for example, any storage device used for storing data accessible by a computer (e.g., a processor may perform various algorithms on data received from a camera device, and a computer memory can then store the information about the various pixels and can store results of blob detection, target detection, and event detection). Examples of a computer-readable medium include: a magnetic hard disk; a floppy disk; an optical disk, such as a CD-ROM and a DVD; a magnetic tape; a memory chip; a solid state storage device; and a carrier wave used to carry computer-readable electronic data, such as those used in transmitting and receiving e-mail or in accessing a network. A tangible computer-readable medium includes computer-readable media, such as listed above, that are physically tangible. In addition, software may be used in combination with the computing and/or optical components to implement the methods described herein. Software may include rules and/or algorithms to operate a computer, and may include, for example, code segments, instructions, computer programs, and programmed logic. The video source 102 and modules 103-108 may be within a single system or may be dispersed. For example, video source 102 may comprise a video camera at the area to be monitored. Video source 102 providing a video stream to a monitoring location (e.g., a separate second location offsite from the location to be monitored) where modules 103-107 are located. Event detection module 108 may be provided at a third location (e.g., a central station) separate from the monitoring location and the second location. The various modules, computers, cameras, and other image equipment described herein can be connected over a network, which may involve permanent connections such as cables or temporary connections such as those made through telephone or other communication links, and also may include wireless communication links. Examples of a network include: an internet, such as the Internet; an intranet; a local area network (LAN); a wide area network (WAN); and a combination of networks, such as an internet and an intranet. The various hardware and software examples described above are also described in greater detail in the patent documents incorporated by reference herein.

Change pixels may be detected by the change detection module 103 as the pixels of the video image provided by video source 102 that are different from a previously obtained background image. The background image may be dynamic. The dynamic background image model may be continuously built and updated from the incoming video frames. Thus, changes in lighting, weather, etc., which modify the video image may be accounted for in the background image. In 104, frame differencing may be used to detect moving pixels. In 105, one or both of the change pixels from module 103 and moving pixels from module 104 are considered to determine foreground pixels which are spatially grouped into foreground blobs. The video image may be processed by existing video content analysis systems and methods to extract foreground, foreground blobs and foreground blobs of interest (such as human foreground blobs), such as like described in U.S. Pat. No. 7,825,954, to Zhang et al., published on Nov. 2, 2010, the contents of which are incorporated herein by reference in their entirety. Depth sensor information may optionally be used to estimate a real-world height or size of each object detected as a potential human being, and as a result, the blobs corresponding to potential human targets (as contrasted with blobs not of interest) may be more accurately identified. Depth sensor information may optionally be used to eliminate shadows, specularities, objects detected as outside the area of interest, objects too far away (e.g., that may not be close enough to allow for accurate analyses), or other elements of the video image that may increase the risk of faulty analysis of the video image. Exemplary details of use of depth information may be found in U.S. patent application Ser. No. 13/744,254 to Zhang et al., the contents of which are incorporated by reference in their entirety. The blobs are tracked over time to form spatio-temporal targets in target tracking module 107, and finally, event detection module 108 detects the event of interest defined by the user using the output of the target detection and tracking process. Instead of or in addition to simple spatial grouping of foreground pixels into blobs, human detection module 106 uses calibration information and a convex region shaped human model to detect humans even in crowded scenarios. In some examples, no or minimal training is required in advance for detecting the human objects in the scene. And in the event detection module 108, some novel event detection approaches may be implemented, which may use the human detection results in human detection module 106.

Figure 2:
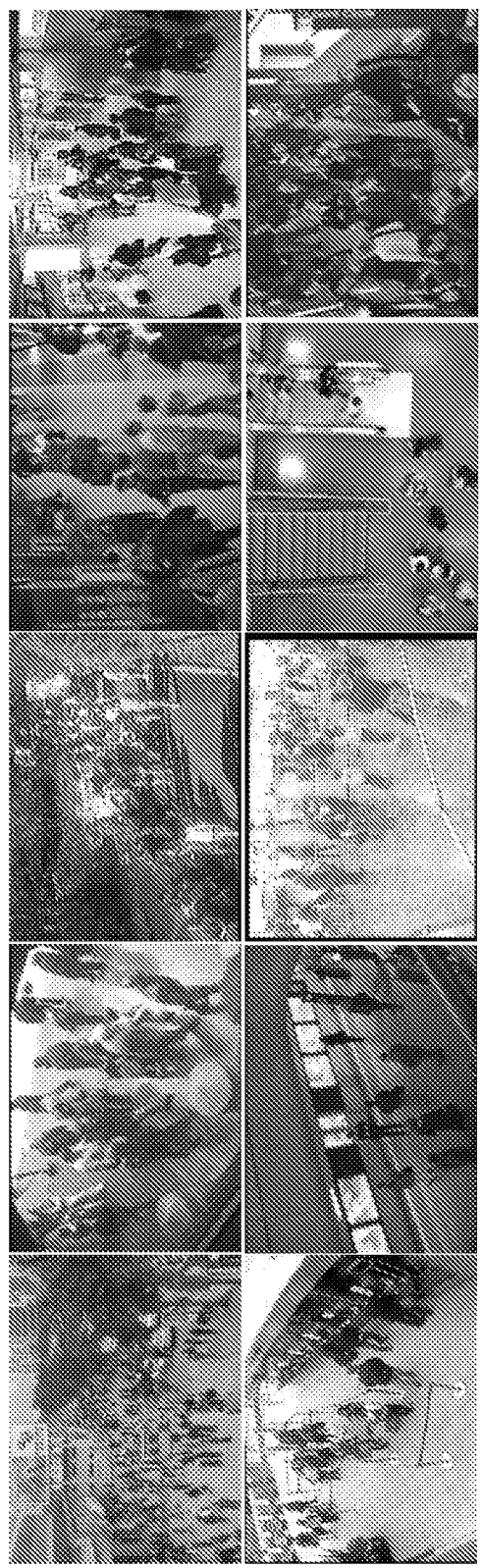
FIG. 2 illustrates an exemplary frame from a video stream from the video surveillance system according to an exemplary embodiment of the invention.

FIG. 2 shows video images corresponding to some typical application scenarios for the IVS system 101 including outdoor plazas, streets, tourist attractions, train stations, shopping malls, metro stops, etc. As can be seen, depending on the position of the camera relative to the scene being videoed, the relative size and shape of the people occupying video images differ.

Figure 3A:
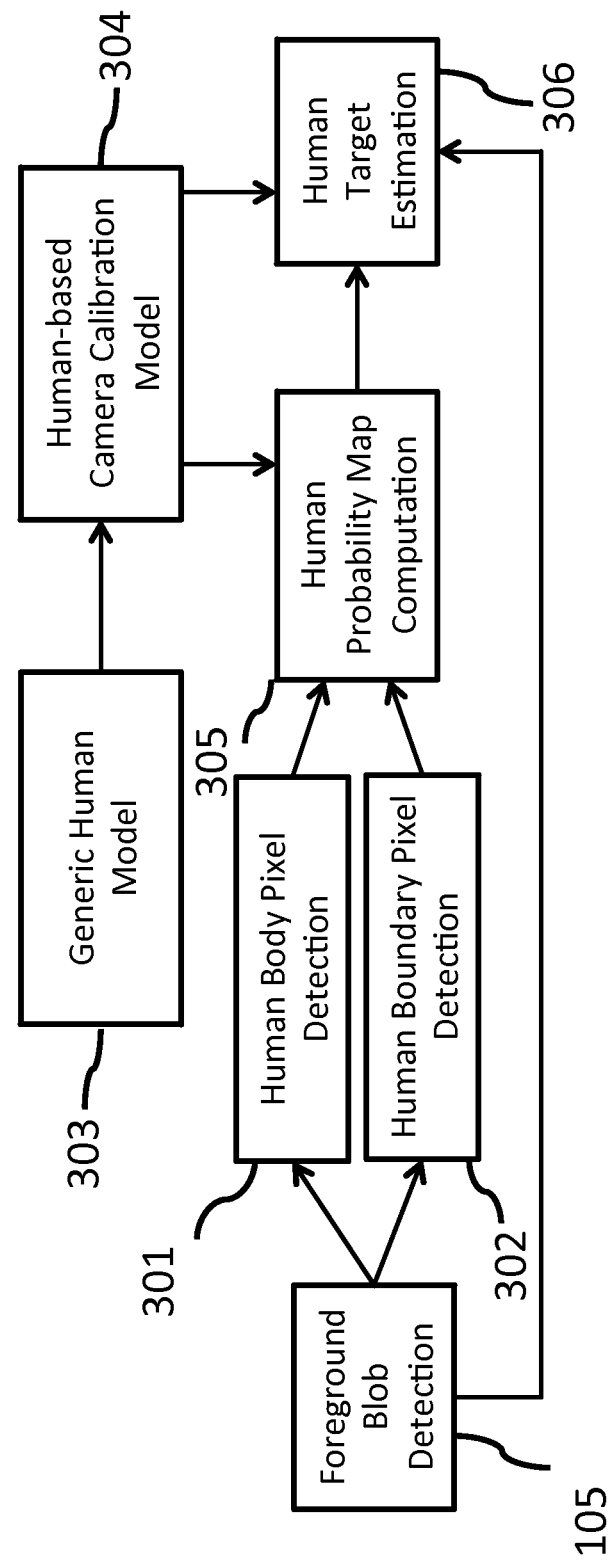
FIG. 3A illustrates an exemplary flow diagram for target detection and counting according to an exemplary embodiment of the invention.

FIG. 3A shows a block diagram providing more exemplary details of the video surveillance system 101. Foreground blob detection module 105 may be the same as that in FIG. 1. Modules 301, 302, 303, 304, 305 and 306 may be elements of the human detection module 106 of FIG. 1. Human body pixel detection module 301 detects human body pixels based on the change pixel results from change detection module 103. These pixels are either significantly different from the background image model (e.g., a brightness difference and/or a color difference exceeds a respective threshold), or located between high confident foreground edge pixels. They are considered most likely to be legitimate human body pixels in the image. See, e.g., 301a of FIG. 6A as an example of detected human body pixels. Other change pixels may be excluded from further human detection processing, since they most likely represent shadows or reflections. Human boundary pixel detection module 302 detects human boundary pixels where the boundary of the foreground blobs aligns with the image edges of the current video frame. See, e.g., 302a of FIG. 6A as an example of detected human boundary pixels. When performing human detection, other analyses may be implemented (in addition to or in replacement of those described above) to assist the determination that a human body has been detected. For example, it may be required that each potential human blob has to contain a certain number of boundary foreground edge pixels. As another example, other processing may recognize blob(s) as likely being associated with an object other than a human (such as a vehicle) and exclude such blob(s) from further human detection processing. Other foreground blobs not considered to be a potential human may be excluded from the foreground blob set. Alternatively, any detected blob may be part of the foreground blob set.

Generic human model module 303 provides a generic human 3D and 2D model. For example, the generic human model module 303 may convert a 3D human model to a 2D human model by mapping or projecting a 3D human model in the real world to a 2D image plane of the video image. FIG. 4 shows an exemplary 3D model 303a mapped to a corresponding 2D human model 303b on image plane 330. The 3D human model 303a may be a set of simple 3D shapes, such as a group of cylinders (e.g., one cylinder for the legs, one cylinder for the torso and one cylinder for the head). The same 3D human model 303a (e.g., the cylinder model) may be used with various video camera positions so that a different angle of the video camera with respect to the ground (ground plane of the real world) may be used to obtain a differently shaped 2D human model 303b in the image plane of the video camera. For example, taking a 3D cylinder human model as an example, a camera angle providing a top-down view of a particular location may map to a circle in the 2D image plane, where as a camera angle having an oblique view of the same location may map the 3D cylinder human model to a different shape having an elongated form. In the example shown in FIG. 17, camera 1702 may have more of a top down view of 3D human model 303a as compared to camera 1704, which may have more of a side view of 3D human model 303a as compared to camera 1702. If the distances of the cameras 1702 and 1704 from 3D human model 303a are the same, the corresponding 2D human model mapped to the image plane of camera 1702 be more compact (e.g., shorter) than the 2D human model mapped to the image plane of camera 1704. The 2D human model may have a convex shape that may be obtained by interpolating points of external edges of the projection of the 3D human model to the 2D image plane.

FIG. 4 illustrates a generic human model that includes a 3D cylinder model 303a and its corresponding 2D convex hull model 303b mapped to 2D image plane 330. The 3D human model 303a consists of a leg cylinder, a torso cylinder and a head cylinder. The length and radius of each cylinder may correspond to the physical statistical data representing the typical dimensions of a typical ordinary human. As shown in FIG. 4, these three cylinders have four key planes: head plane, shoulder plane, hip plane and foot plane. To obtain the corresponding 2D human model at a particular location, we can uniformly sample along the perimeter of the four key planes and project each 3D sample point onto the 2D image plane using the camera calibration parameters to determine the appropriate size and orientation with respect to a particular location within the 2D image space. These corresponding image sample points can then be used to form a convex hull on the image through a convex formation method, which can be used as the 2D image human model.

Figure 5:
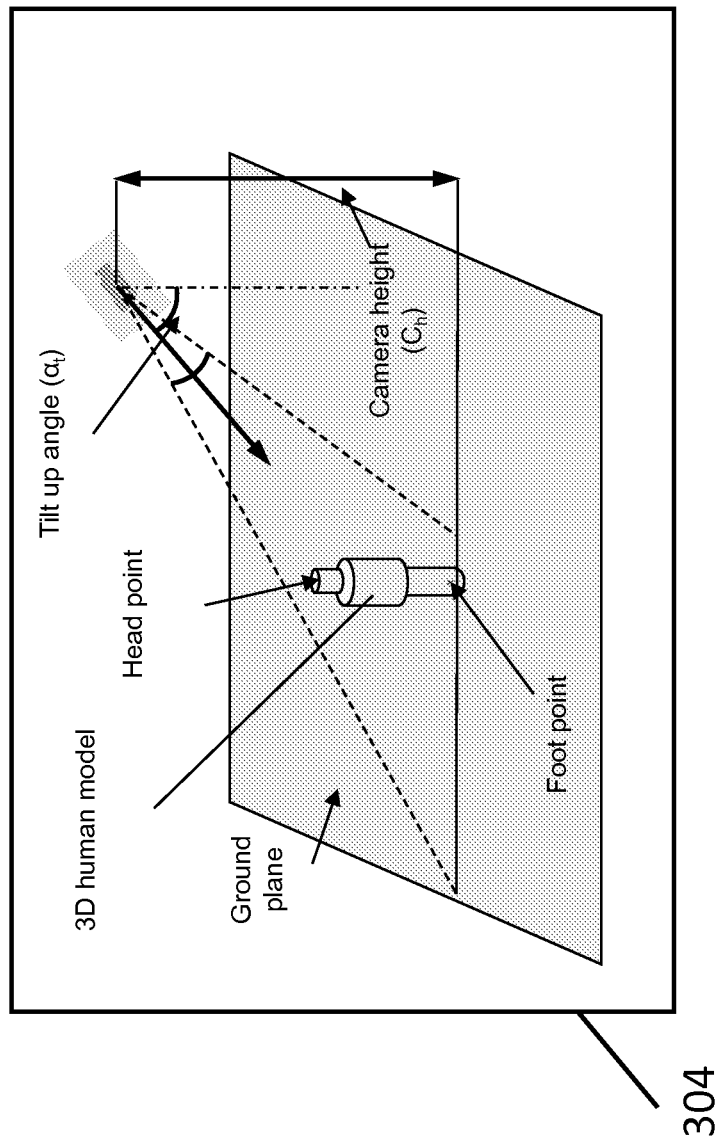
FIG. 5 illustrates a generic flat-earth camera model that may be calibrated using several human image samples.

FIG. 5 illustrates a generic flat-earth camera model which can be calibrated using several human image samples. The camera model may contain only three parameters: the camera height relative to the ground, its tilt-up angle and the focal length of the camera. These parameters can be estimated using three or more human samples from the video frames as described in "A Robust Human Detection and Tracking System Using a Human-Model-Based Camera Calibration" (The 8th International Workshop on Visual Surveillance, 2008, Z. Zhang, P. L. Venetianer and A. J. Lipton) and U.S. Pat. No. 7,801,330, to Zhang et al., published on Sep. 21, 2010, the contents of each which are incorporated herein by reference in their entirety.

In the alternative, or in addition, the generic human model module 303 may have a predetermined 2D model that may be modified (e.g., stretched, shrunk, tilted with respect to a vertical axis of the 2D image plane, etc.) in response to a camera angle of the video camera taking the video image. Several generic human models may be provided by generic human model module 303. Human models may also include modeling for typical accessories. For example, when using the system outdoors, a first human model may be used for warm weather, a second larger human model may be used in cold weather (where coats may be expected to be worn and considered part of the human model) and a third human model may be used for rainy weather (where umbrellas may be expected to be used and considered part of the human model).

Generic human model module 303 also provides an estimate of various sizes of the 2D human model at corresponding locations within the image space. The image space may correspond to the two dimensional space of an image in a frame of video provided by video source 102. An image space may be measured in pixel increments, such that locations within the image space are identified by pixel coordinates. A video camera may take a video image, comprising a two-dimensional image of the three dimensional real world. When a human is present at a certain location within the real world, the human may be expected to occupy a certain amount of foreground at a certain location within the two dimensional video image. If the human is far away from the video camera, the image size of the human may be expected to be relatively small as compared to the image size of a human close to the video camera. For each of a plurality of locations within the two dimensional video image space, generic human model module 303 may provide an human model having a size corresponding to the location within the two dimensional image space. For each location, the 2D human model may have dimensions and/or a size responsive to the respective location within the image space of the two dimensional video image. Orientation of these human models may also be responsive to location within the two dimensional image space. For example, some camera lenses (e.g., wide angle lenses) may represent a vertical direction in the real world with a first direction at one side of the video image frame and a second, different direction at a second side of the video image frame. The 2D human models may have different orientations at different sides of the video image frame (and other locations) in response to the different representations of the real world vertical direction.

Locations of each of the plural human models within the 2D video image space may be associated identifying coordinates within the 2D video image space. The identifying coordinates may correspond to pixel locations of a video having the 2D video image space. For example, a location corresponding to the $10^{th}$ row, $22^{nd}$ column of a pixel array may be correspond to an identifying coordinate of (10, 22). For each of the plural locations within the 2D video image space, the generic human model module 303 may map a particular point of the human model to the associated identifying coordinate. For example, the particular point of the human model may be the top of the human model corresponding to the human's head, the bottom of the human model corresponding to the human's foot, the centroid of the shape of the human model corresponding to a center of a human. The remainder of the human model may be mapped to the 2D video image space relative to the associated identifying coordinate and size of the human model based on a fixed relationship between the particular point of the human model and the remainder of the human model. As an example, assume the human model is a circle. For each pixel within the 2D video image space, the center of a corresponding circle is mapped (e.g., associated with (x, y) coordinates of the 2D video image space), where the remainder of the circle shape is mapped to the 2D video image space taking into consideration the corresponding size of the circle (and the known relationship of the circle to its center). A location of particular portion of the human (such as the top of the human's head, the bottom of the human's foot, the center of the human) in the three dimensional real world may have a unique correspondence to its location in the two dimensional video image, and thus, existence of this particular point of the human within the two dimensional video image may be used to determine a location of the human within the three dimensional real world.

Generic human model module 303 may also determine a size of the human model for each identifying location within the 2D image space. The size of the human model may be obtained from calibration of the video surveillance system 101. For example, a calibration model of known size may move around the area to be monitored while the video surveillance system 101 takes video for calibration purposes. The calibration model may be a person of known height walking around the monitored area. During calibration, the system may identify the calibration model in the video as a foreground blob and recognize (e.g., by accessing calibration information provided to the video surveillance system 101 regarding the size of the calibration model) that the foreground blob corresponds to a predetermined size (e.g., a predetermined height). Here, as the calibration model moves through the area to be monitored during video calibration, for various locations within the video image, the system may correlate the known height of the calibration model to a size in the 2D video image. For example, when a center of the calibration model is at location (x1, y1), the height of the calibration model may be 15 pixels (or may be measured in some other measurement). When the center of the calibration model is at location (x2, y2), the calibration model may be 27 pixels in height. Thus, the video surveillance system 101 may correlate dimensions of the 2D video image at particular locations (e.g., (x, y) coordinates)) in the 2D video image to sizes (e.g., heights) in the real world by correlating the 2D video image size to the known size (e.g., height) of the calibration model. Based on the known correlation (obtained through this calibration) between real world sizes and the dimensions within the 2D video image at particular locations (e.g., (x, y) coordinates)) within the 2D image, the 2D size of the human model within the 2D video image space may be calculated for each of the various locations ((x, y) coordinates)) within the 2D video image to correspond to an average human size within the real 3D world.

For examples of calibration procedures, see U.S. Pat. No. 7,932,923 issued to Lipton et al and U.S. Pat. No. 7,801,330, issued to Zhang et al., the contents of each which are incorporated herein by reference in their entirety. In general, using parameters input or obtained via a calibration procedure, such as camera height (H), vertical and horizontal camera field of view angles ($\theta_H$, $\theta_V$), and camera tilt angle ($\alpha$) and other information, such as detected outer boundaries of an object (e.g., a top and bottom of a person), the camera system can generally determine the real world size and shape of an object for identification purposes.

Human-based camera calibration model 304 may receive and store the human model with the appropriate size from the generic human model module 303 along with the appropriate corresponding locations within the video image space. These human models and corresponding locations may be stored in a look-up table. For example, each of plural (x, y) coordinates within and outside the video image space may be used to identify a corresponding human model. For example, when the (x, y) identifying coordinate corresponds to a centroid of the human model, in estimating the existence of a human object within a video image centered at location (x1, y1), the lookup table of the human-based camera calibration model 304 may receive location (x1, y1) as an input and provide a corresponding human model (including its size and location within the 2D image space). For example, the output may comprise a boundary within the 2D image space or may comprise the complete set of pixels (e.g., (x, y) coordinates of all pixels) within the image space to describe the corresponding human model.

Figure 3B:
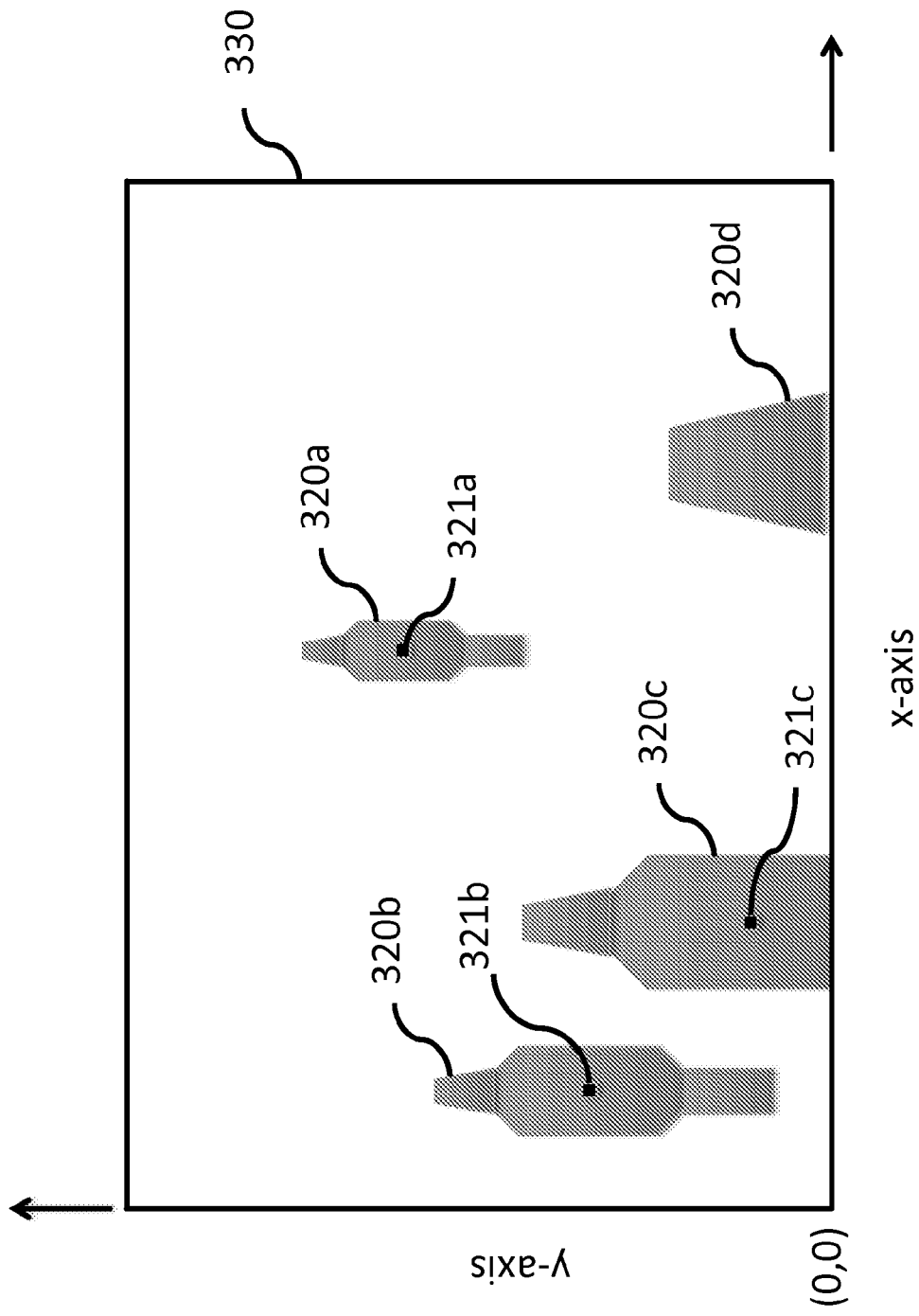
FIG. 3B illustrates an example where several human models occupy a two-dimensional video image, each corresponding to a different location with respect to the two-dimensional video image

FIG. 3B illustrates an example where several human models occupy a two-dimensional video image, each corresponding to a different location with respect to the two-dimensional video image. As illustrated, four human models 320a, 320b, 320c and 320d are associated with different (x, y) identifying coordinates with respect to the two dimensional video image. Human model 320a is smallest, corresponding to a location farthest away from the video source in the three dimensional real world. Human models 320b, 320c and 320d correspond to locations within the three dimensional real world that are successively closer to the video source. The human models 320a, 320b, 320c and 320d may all be derived from the same full human shape model. However, it may be estimated that only a portion of the full human shape model may occupy the two dimensional video image at certain locations. Here, it is estimated that the full human shape model corresponding to human shapes 320c and 320d only partially occupying the two dimensional video image space 330; human model 320c is estimated as a torso and head combination of the full human shape model, where human model 320d corresponds only to a head portion of the full human shape model.

Each human model 320a, 320b, 320c and 320d is associated with an (x, y) identifying coordinate with respect to the two dimensional video image. In this example, the identifying coordinates of human models 320a, 320b 320c and correspond to the centroid of the human model. The (x, y) identifying coordinates associated with estimated shapes 320a, 320b and 320c are 321a, 321b and 321c respectively, and fall within the (x, y) coordinates of the video image. The (x, y) identifying coordinate associated with estimated shape 320d falls outside the (x, y) coordinates of the video image. That is, in this example, the centroid of the human shape model associated with 320d is located below the video image and thus its identifying (x, y) coordinate has a negative y-axis value, which in this example, is outside the coordinates of the video image (and not shown in FIG. 3B). For ease of calculations, the (x, y) identifying coordinates may increment in pixel units so that identifying coordinates 321a, 321b and 321c also identify pixels of the video image.

Figure 3C:
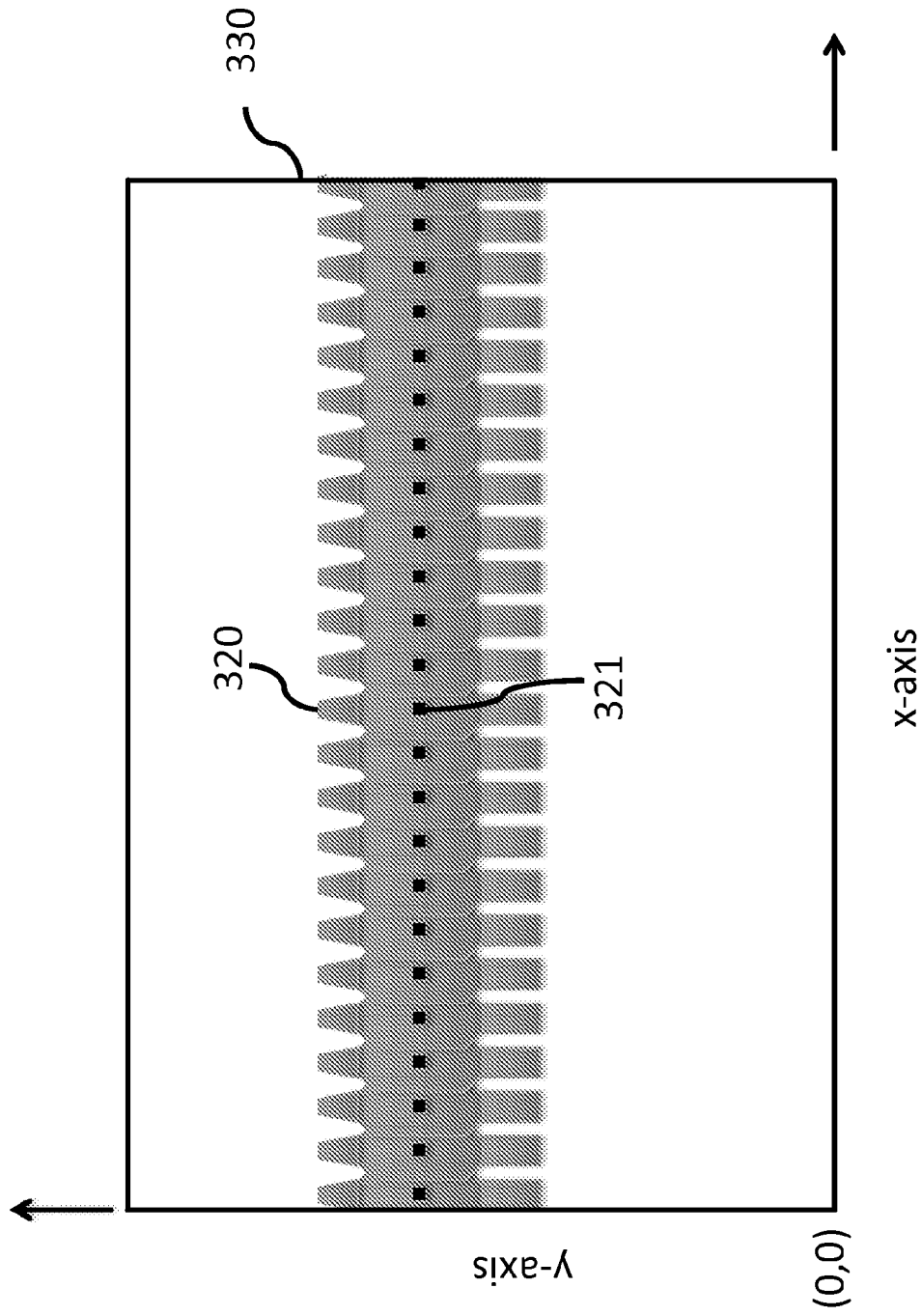
FIG. 3C illustrates a single row of (x, y) identifying coordinates 321 each associated with a corresponding human model 320.

FIG. 3B illustrates only four human models associated with four respective identifying coordinates, for purposes of ease of explanation. However, human-based camera calibration model 304 may store an human model for a large number of (x, y) identifying coordinates, such several of these that human models may overlap with one another. FIG. 3C illustrates a single row of (x, y) identifying coordinates 321 each associated with a corresponding human model 320. For ease of illustration, only a single row is illustrated, but human models may be provided for plural rows of (x, y) identifying coordinates, which may be regularly distributed in the x and y directions over the image space 330. As discussed, the size of the shapes may differ for the different locations (although they re shown to have the same size in FIG. 3C). For example, human-based camera calibration model 304 may store a human shape for every pixel in the 2D image space 330 as (x, y) identifying coordinates of the 2D image space 330 as well as for (x, y) coordinates outside the 2D image space 330 associated with a human model that is at least partially located within the 2D image space 330. For example, for all (x, y) pixel coordinates within the video image space 330, human-based camera calibration model 304 may store an (x, y) identifying coordinate and an associated human model (which may comprise a boundary or a set of pixels) of a sub-space within the video image space 330 expected to be occupied by a human when the centroid of the human model is located at that (x, y) identifying coordinate within the video image space 330 of a video image. The (x, y) identifying coordinates may also include all (x, y) identifying coordinates outside the video image space 330 that are associated with a human model within a sub-space within the video image space 330 (that is, a portion of the full human model may be located within a sub-space of the video image space 330). For some situations, the above referred to sub-space may include the entire video image space 330 (corresponding to an estimate of when a human is positioned to fully occupy the video image). The human-based camera calibration model 304 may store the (x, y) identifying coordinates and associated human model as a look-up table. While the centroid of the full human shape model corresponds to the (x, y) identifying coordinates of the human model in this example, other identifying points of the human shape model may be used (e.g., an eye, nose, center of head, top of head, toe, bottom of foot, etc.).

Human probability map computation module 305 uses the foreground blob set of a particular frame of a video image output by the foreground blob detection module 105 and the human models with their corresponding identifying coordinates output from the human based camera calibration model 304 to compute the human target probability for each of plural locations within the two dimensional video image, such as for each image pixel location. The plural calculated probabilities may be associated with the plural locations to create a probability map. The plural locations may be the same as the (x, y) identifying coordinates of the human models.

For each (x, y) identifying coordinate, a calculation is made to determine a corresponding probability of an existence of human object within a video image. When the (x, y) identifying coordinates have a one-to-one correspondence to the pixels of the video image, then a probability calculation is made for each of the pixels of the video image. For example, for each image pixel, a corresponding human probability may be calculated as the likelihood of the existence of a human target whose image center is on the pixel under consideration. A probability map may be created mapping each of the probability calculations to each (x, y) identifying coordinate. The probability map may be stored in a look-up table, associating each (x, y) coordinates (as an input) with the associated calculated probability. This look-up table may be the same as the look-up table of the human-based camera calibration model module 304 (storing human models as an entry) or may be a second, separate look-up table.

As noted above, identifying coordinates may fall outside the video image space, and thus calculations may be made to determine corresponding probability of an existence of the human object within the video image (regarding the portion of the corresponding full human 2D model falling within the image space (the human model) associated with these identifying coordinates). For example, if a centroid of a 2D full human model corresponds to the identifying coordinates, it may be located outside the video image space, but may correspond to a 2D human model within the video image space that is a portion of the full human model. For example, shoulders and head of a full human model may constitute the 2D human model (the shoulders and head falling within the image space) even though the centroid of this full human model (e.g., near a belly button of the full human model) falls outside the image space (the centroid corresponding to the identifying coordinates used to identify the corresponding shoulders/head 2D human model). In some examples, a certain percentage of the full human 2D model must fall within the image space for a probability calculation to be made (or considered). For example, when less than 10% or less than 20% of the full human 2D model is within the image space (or, when the human model is less than 10% or less than 20% of the full human 2D model), the probability value associated with the identifying coordinates may be set to zero or ignored. In some examples, when less than 40% of the full human 2D model is within the image space, the probability value associated with the identifying coordinates may be set to zero.

The probability calculation for each (x, y) identifying coordinate may be the recall of the human model associated with the corresponding (x, y) identifying coordinate and the foreground blob set. For example, the probability calculation for each (x, y) identifying coordinate may be the recall of the human body pixels and the human boundary pixels within the human model associated with the corresponding (x, y) identifying coordinate. The human model associated with the corresponding (x, y) identifying coordinate may be output from the human-based camera calibration model module 304 (e.g., stored in a look-up table of the module 304). The foreground blob set may be output from the foreground blob detection module 105. The recall of the estimated shape with the foreground blob set may be calculated as the ratio of the human model area that overlaps with the foreground blob set to the human model area. Probability calculations that do not exceed a certain threshold may be ignored. For example, calculated probabilities less than 0.4 (on a scale of 0 to 1) may indicate that there is no human target centering at that location. Calculations other than a recall calculation may be made to determine a probability of the existence of a human object in the video image corresponding to each of the plural estimated shapes. It will be understood that the calculated probabilities are estimates. Thus, a calculated probability of 1 (on a scale of 0 to 1) does not indicate absolute certainty of the existence of a human at the relevant corresponding location.

FIG. 3D illustrates an exemplary method for calculating a human probability map, which may be implemented by the system of FIG. 3A. In step S340, the calibrated camera model in 304 may be used to map the image plane of the 2D image space onto the real world ground plane. In step S342, a human model may be obtained for N locations in the 2D image space (N being an integer equal or greater than 2). The calibrated camera model 304 may be used to obtain the corresponding convex hull shaped human model as the human model for every image pixel position in the 2D image space. Each of the human models may be associated with an identifying coordinate in the 2D image space. For example, the human centroid point of the human model may be used as the reference point when performing the mapping to the identifying coordinate. Assuming identifying coordinate of the 2D image space is the centroid of a human in the image space, its corresponding physical footprint location on the real world ground plane can be computed through the calibrated camera model (e.g., as shown in FIG. 5). A generic 3D (e.g., multi-cylinder) human model is then placed on that footprint location. The size of the 3D model may correspond to previously obtained calibration data. The generic 3D human model may be projected or mapped onto the 2D image plane to obtain the human model in the 2D image space. For example, the projection of a 3D multi-cylinder human model may be used to form a corresponding 2D image convex hull as the image human model with the centroid at the associated identifying coordinate (e.g., the image point under consideration). This way, every valid image pixel may have a corresponding convex region shaped human model (as the human model) showing the approximate human size and shape at that image location. To reduce the computational cost, the convex region shaped human models can be pre-computed at the initialization of the system, the rectangular bounding box of the human convex model can be used to obtain the approximate human recall ratio using integral image. In step S344, the foreground blob set may be extracted from a video image. The foreground blob set may comprise one or more foreground blobs detected using the human foreground pixels extracted by module 301 and/or the human boundary pixels extracted by module 302. In step S346, for each of the N locations, a probability of the existence of a human at that location is calculated to obtain a probability map. The human probability measure may be defined as the human recall ratio given there is enough human boundary pixels in the image human convex model. The human recall ratio in this example is the number of human foreground pixels computed in 301 in an image human convex model over the total area of this human convex model. The order of the steps of the process of FIG. 3D may be performed in an order other than that shown. For example, step 344 may be performed before one or both of steps 340 and 342.

Referring to FIG. 3A, based on the human probability map computed in 305, a human target estimation module 306 may find a best number of human models (e.g., human objects) in the video image and their locations. A global optimization method can be used to find the best number of human models and their locations. If m ($m_1$, ..., $m_M$) denotes the M set of human models from all the potential human models within the image space, the objective is to find the optimal set n* so that a criterion function f(n*) reaches global maximum. That is, the objective is to find:

$$\underset{n \in m}{\operatorname{argmax}} f(n)$$

where n is a particular set of the plural human models in the image space, and f(n) is a function calculated for this set of human models.

As discussed further below, the function f(n) is calculated for each of several selected sets of human models, each set selecting $m_i$ locations from the probability map ($m_i$ locations being selected for each pass, where the number $m_i$ may differ for each of these passes). Each set of human models may be selected with a pass (or scan) of the probability map, with certain constraining criteria used to select locations being altered for each pass. Here, the function f(n) is defined as:

$$f(n) = w_R * R(n) + w_P * P(n) - w_O * O(n)$$

where R is the human recall ratio, which is defined as the percentage of the human foreground area over the entire area of the group of n selected human models; P is the human precision, which is the percentage of the foreground area that is overlapping with the group of n selected human models and O is the human overlap ratio, which is the ratio of the area of overlap of any of the n selected human models with each other to the area occupied by all n selected human models, and $w_R$, $w_P$ and $w_O$ are the weights. It may be advantageous to find the best matching between the foreground region (foreground blob set) and the union of the human models (the set of m human models) without too much human overlaps. In practice, how to determine the above three weights may significantly impact the detection results, for example, if more weight is put on reducing the human overlap ratio, it may result a lower human counting.

Each of the $m_i$ selected human models may be selected by reference to the probability map output by the human probability map computation module 305. Several passes may be made to perform a calculation f(n), each pass selecting a subset of m; human models from the 2D human models provided by the generic human model module 303 and associated with an (x, y) identifying coordinate in human-based camera calibration model 304 (e.g., in a look-up table). As noted, the value of $m_i$ may differ for each of these passes. Selection criteria of the human models may differ for each pass such that different human models are selected for the different passes (and possibly, a different number $m_i$ of human models are selected for the different passes). Selection criteria may include requiring the selected human model to be associated with a probability threshold $P_{th}$ as set forth by the probability map. Selection criteria may also include the next selected 2D human model to be a minimum distance $D_{min}$ away from any previously selected 2D human models. The minimum distance $D_{min}$ may be a distance on the ground plane of the real world. For example, centroids of the 2D human models may be mapped or translated to locations within the 3D real world and distances therebetween may be calculated. The minimum distances $D_{min}$ may be calculated within the 2D image plane, but distances within the 2D image plane may reflect corresponding 3D locations, such that for human models nearby the video image source, larger separation may be required in the 2D image plane than that for more distant human models.

In some exemplary embodiments, one or more fast one-pass scanning of the probability map is used to determine the human count and corresponding positions. FIG. 3E illustrates a method of performing a single pass of the probability map as part of finding a best number of human models within a video image. The method of FIG. 3E may be implemented by human target estimation module 306. In step S350, probability map is scanned to find a local maximum (which may be qualified by certain selection criteria). The probability map may be scanned in to locate an available unselected local maximum that corresponds to a location in the real world closest to the video source. The bottom of the probability map may correspond to the bottom of the video image. In many implementations, a video camera performing a surveillance function may be mounted at a location higher than head level of humans within the area to be monitored. Thus, the bottom of the video image may correspond to a location closest to the video source. Scanning the probability map from bottom top in this example allows selection of human models less likely to correspond to an occluded object within the video image.

The probability map may be scanned bottom to top to find a local maximum point, representing a local maximum of the previously calculated probabilities (stored in the probability map) for each of the plural locations within the image space. A local maximum may be an (x, y) identifying coordinate (e.g., pixel) having a probability value higher than the probability values of each of the immediately neighboring (x, y) identifying coordinates (e.g., immediately neighboring pixels). Once a local maximum point is found, the human model associated with this local maximum point as its identifying coordinates is selected as one of the set of $m_i$ human models in step S352. In step S354, all of the pixels within this selected model's internal region (e.g., falling within the 2D human model's boundary) and pixels corresponding to a minimum distance $D_{min}$ away from this selected model (e.g., pixels in the video image representing a minimum distance on the ground plane of the real world) are excluded from further consideration in this pass (and may be temporarily removed from the probability map for this pass). Note that in this example, pixels correspond to the identifying coordinates of the human models and this description is equally applicable to identifying coordinates that are not pixel locations. In some examples, the video image itself need not be analyzed further at this stage, and the pixels may be excluded from further consideration simply by their temporary removal from the probability map. The probability map is scanned again to select another local maximum point of the probabilities of the human probability map associated with pixels that are greater than the probability threshold $P_{th}$ and have not be excluded. In step S356, it is determined if any valid pixels have been considered. That is, the probability may be reviewed for values of that have not been excluded by the selection criteria nor excluded by the selection of other human models in this scan of the probability map. The scan of the probability map is continued until all the valid pixels are considered and removed from the map. Thus, $m_i$ human models may be selected with this scan of the probability map. For this pass, the function $f(m_i)$ is calculated for this set of $m_i$ human models.

Additional scans of the probability map may be performed, with each on-pass scan having a different set of selection criteria. FIG. 3F illustrates a method of performing plural passes of the probability map as to find the best number of human models within a video image. The method of FIG. 3F may be implemented by human target estimation module 306. Here, the value of at least one of $D_{min}$ (minimum distance) and $P_{th}$ (probability threshold) may be different for each scan. In step S360, the selection criteria are set for a particular on-pass scan. How many alterations of the selection criteria (and thus how many scans) may be determined on a case-by-case basis, taking into consideration desired accuracy and computational overhead. In step S362, a scan of the probability map is made to select a set of m human models in accordance with the selection criteria.

The value m is an integer equal to zero or more and may differ for each selection (e.g., for each loop of FIG. 3F performing step S362). Step S362 may be correspond to the method of FIG. 3E. In step S364, a criterion function is calculated for the selected $m_i$ human models, e.g., a corresponding $f(m_i)$ is calculated for the $m_i$ human models selected in this scan. Additional scans may be performed with new selection criteria (S366). When all scans of the probability map are complete, the maximum of f(n), $n \in \{m_1, \ldots m_M\}$ of the group of scans is determined. The set of human models corresponding to this maximum value is determined to correspond to human objects within the video image (S368). Using the (x,y) identifying coordinates (e.g., pixel locations) of the human models determined to represent human objects in the video image, the real world location on the ground plane may be determined.

In an alternative embodiment, if m denotes the set of human models from all the potential human models within the image space, the objective may be to find the optimal set m* so that a criterion function g(m*) reaches global maximum. That is, the objective is to find a maximum of:

$$g(m) = \sum_{n=1}^{m} f(n)$$

where n is a particular one of the plural human models in the image space, m is a number of selected human models (which may vary for different summation calculations), and f(n) is a function calculated for each of the m human models, rather than the group of models.

Here, the function f(n) is defined as:

$$f(n) = w_R * R(n) + w_P * P(n) - w_O * O(n)$$

where R is the human recall ratio, which is defined as the percentage of the human foreground area over the entire area of the selected human models; P is the human precision, which is the percentage of the foreground area that is overlapping with the selected human models and O is the human overlap ratio, which is the overlap of the selected nth human model with areas occupied by the $1^{st}$ to n−1th human models [the areas occupied by human models previously selected in the current pass in calculating $\Sigma f(n)$], and $w_R$, $w_P$ and $w_O$ are the weights. Each of the passes of scanning the probability map discussed above may be associated with calculating $\Sigma f(n)$, with different constraints on the selection criteria in selecting the local maximums of the probability map for each pass. Other functions f(n) may be used other than those described herein.

Figure 6A:
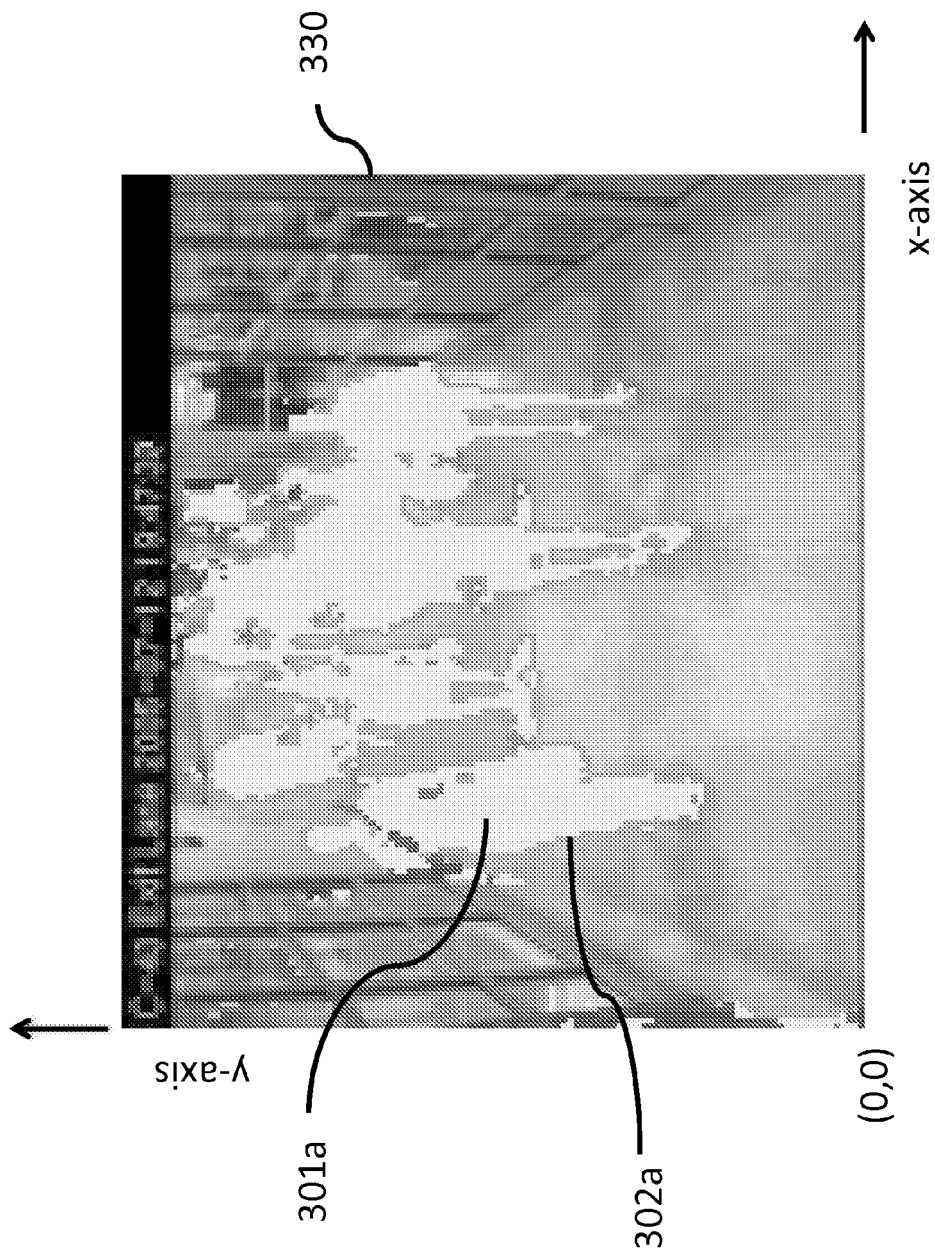
FIGS. 6A, 6B and 6C shows exemplary detection results.
Figure 6B:
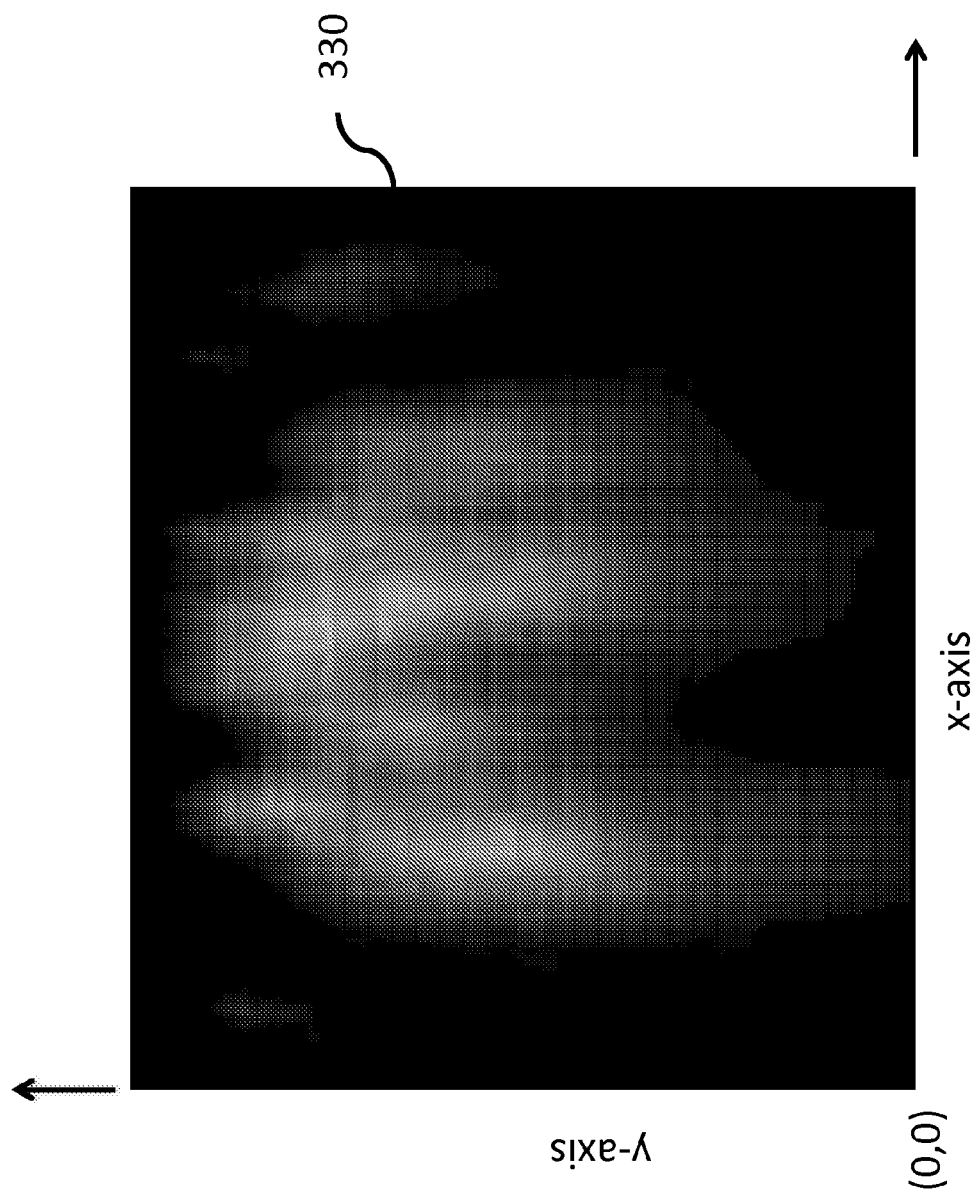
Figure 6C:
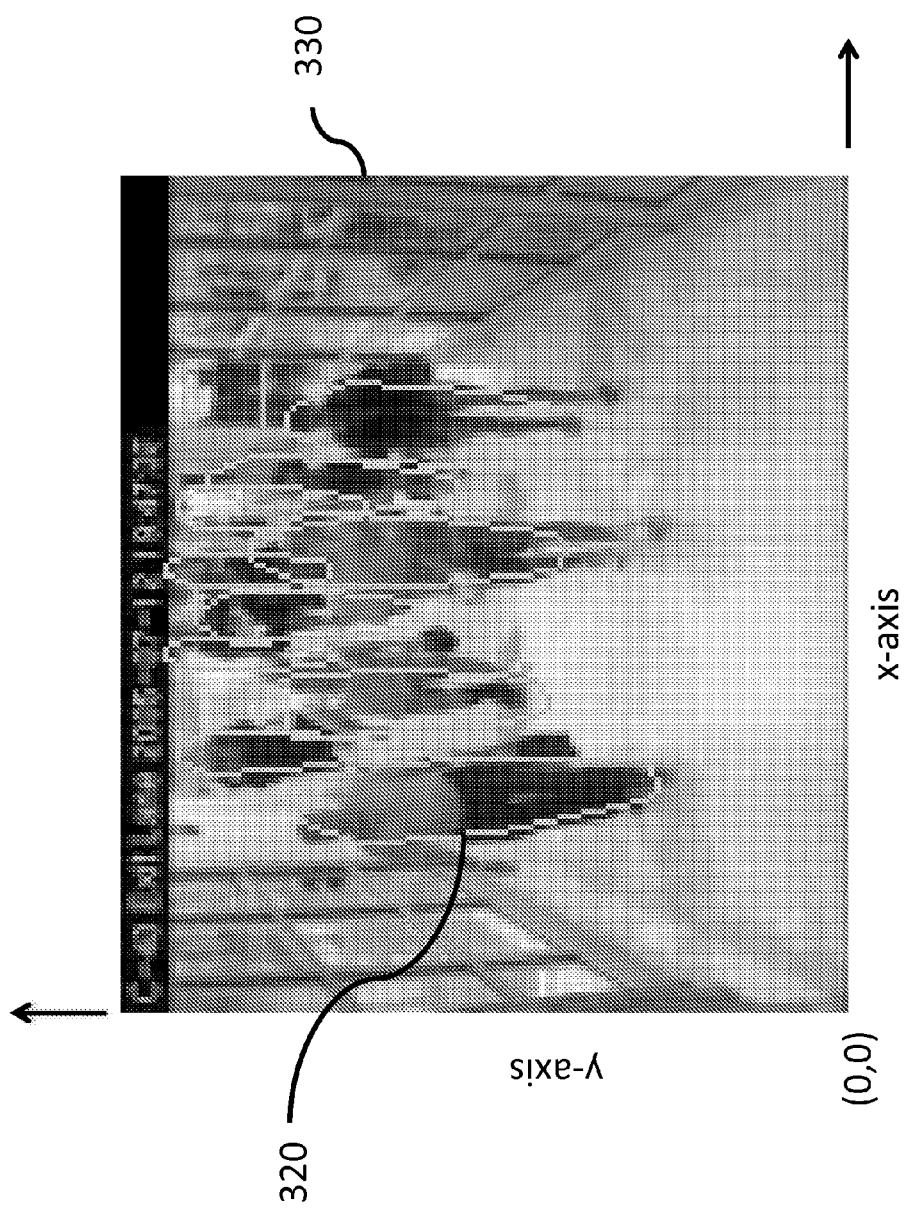

FIGS. 6A, 6B and 6C show detection results of the video surveillance system 101 according to one example. For one input frame, FIG. 6A is the output of the human body detection module 301 and human boundary pixel detection module 302, where the pixels 301a indicate the detected human body pixels and the pixels 302a show the human boundary pixels. The foreground blob set is represented in FIG. 6A as the combination of the detected human body pixels 301a and the human boundary pixels 302a. The detected human body pixels and human boundary pixels are superimposed over the original video image frame defining the video image space 330. In this example, the remainder of the video image in this video image frame (other than the foreground blob set) is part of the background image.

FIG. 6B illustrates the human probability map computed from FIG. 6A. In this example, the human probability map represents calculated probabilities on a grey scale, with black corresponding to a probability of zero (0) and white corresponding to a probability of one (1). Each of the calculated probabilities is represented at a location within the image space 330 corresponding to the pixel corresponding to the identifying coordinates of a corresponding human model.

FIG. 6C shows the final human detection result, illustrating a plurality of human models 320 (pink convex shape outline) corresponding to the detected human. Each of these human models may be associated by an identifying coordinate (such as a centroid) which may identify the location of the detected human in the 3D real world and mapped to the ground plane of the real world (not shown).

Figure 7A:
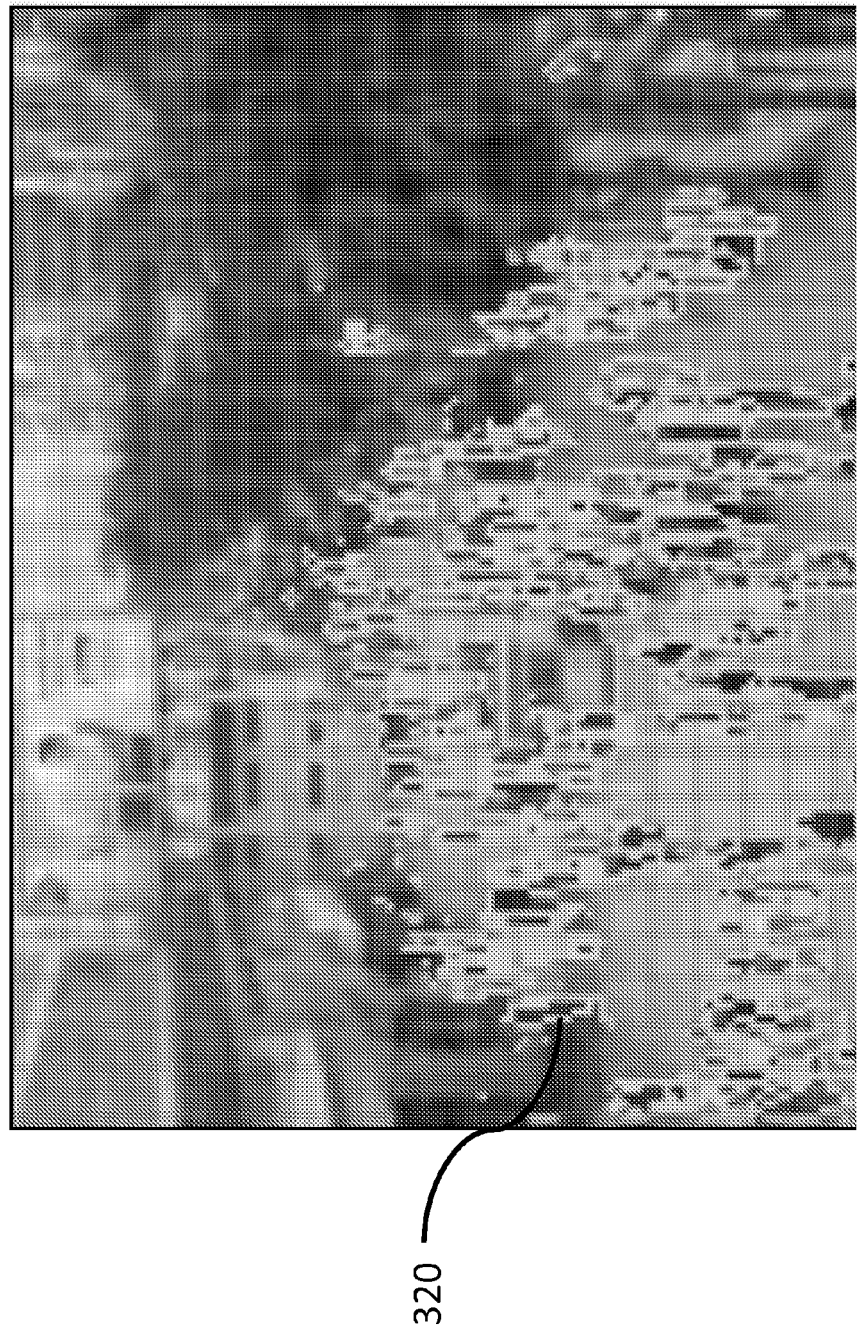

FIGS. 7A, 7B and 7C illustrate an example of measuring human crowd density based on the human detection results. FIG. 7A illustrates an exemplary result of the video surveillance system 101 detection results, showing plural 2D human models 320 (pink convex hulls), each corresponding to a detected human, overlaying the original video image. FIG. 7B illustrates mapping the detected humans to the real world physical ground plane, showing a top down representation of the video image of FIG. 7A with each of the circles representing the human model 320 as mapped to the physical ground plane of the real world and thus identifying a location of the detected human within the real world. The detected human targets can be mapped onto a physical ground plane as calibration has provided a correlation between a known size of the calibration model, a location within the 2D image, and a corresponding size within the images space. With known locations, calculations may be made to count the number of people within a certain identified area (e.g., selected by a user) or within the entire scene. Calculations may also be made to determine a number of people per area. Real crowd density measurements on each ground location may also be directly computed. The actual definition of the crowd density measure may depend on the real application, in particular, on the size of the crowd to be monitored. For example, for the scenario shown in FIGS. 6A, 6B and 6C, one may use the number of people within a 2 meter radius as the crowd density measure. While for the scenario in FIGS. 7A, 7B and 7C, the crowd density of a location can be defined as the number of people within a 6 meter radius. FIG. 7C illustrated the crowd density map using a radius of 6 meters with higher intensity pink signifying higher crowd density.

Figure 8:
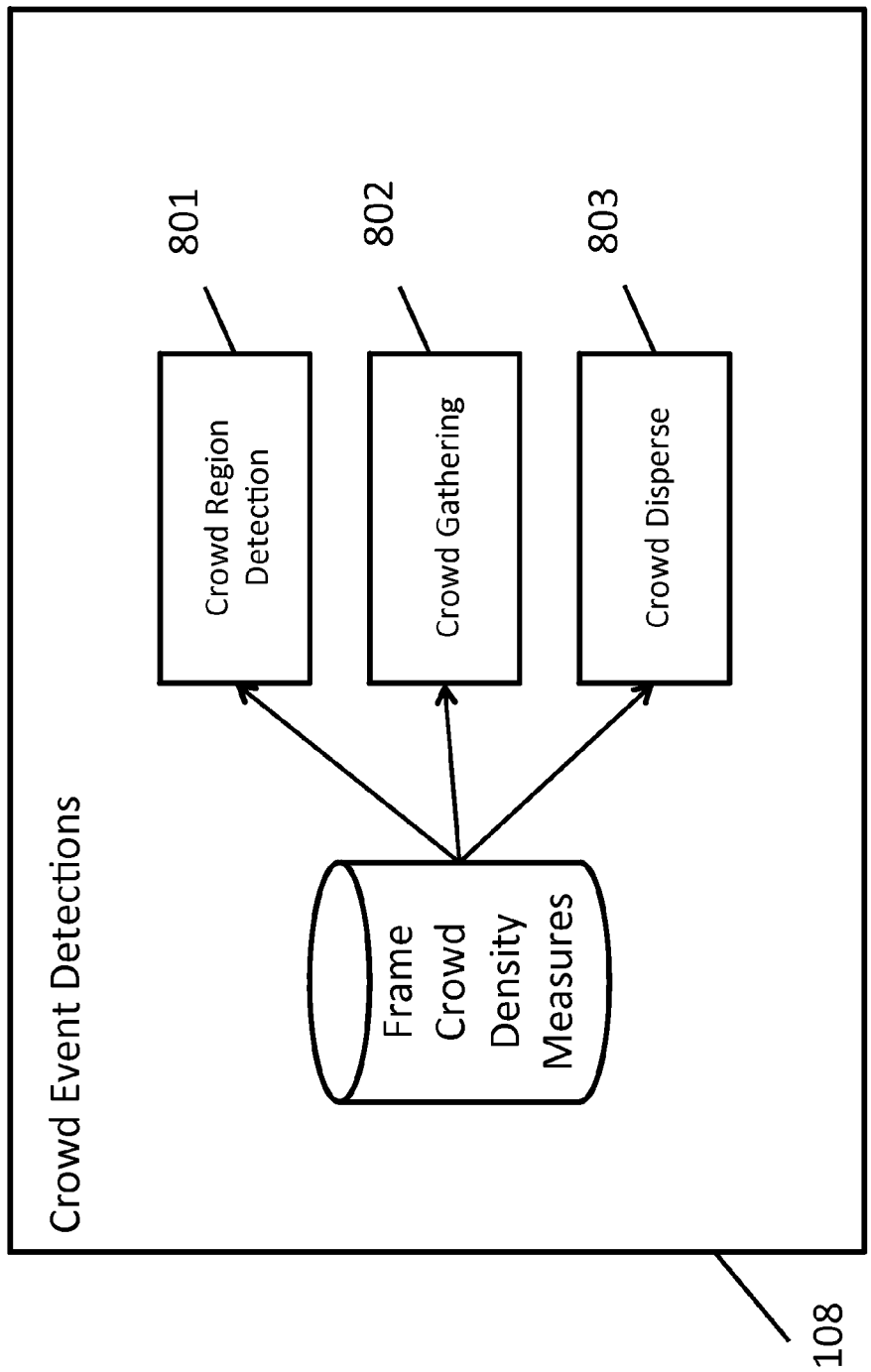
FIG. 8 illustrates exemplary implementations for detecting various crowd related events.
Figure 9:
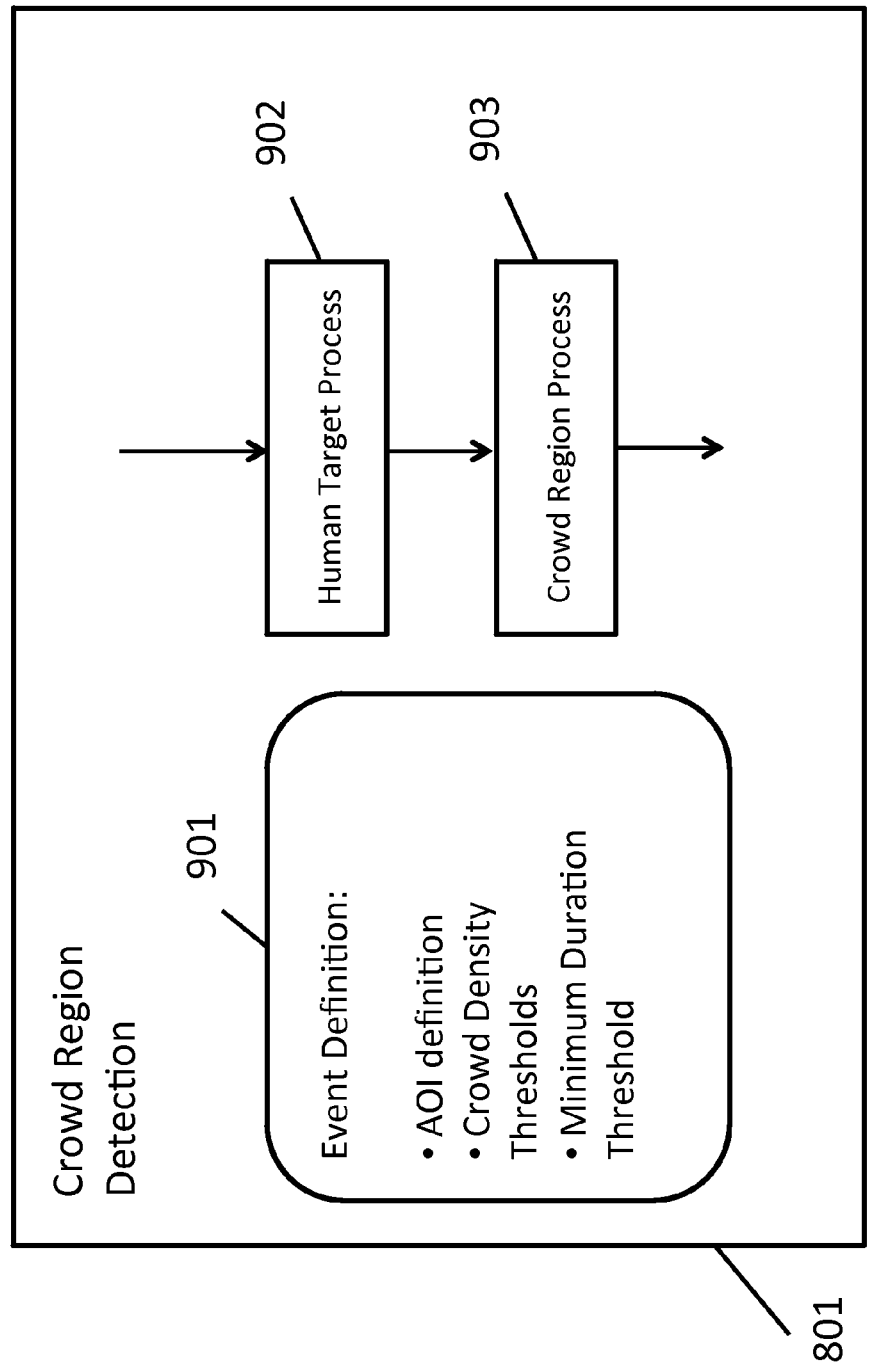
FIG. 9 illustrates an exemplary method of how to define and detect a crowded area.

Based on the crowd density measures for each video frame, one can detect many crowd related events as shown in FIG. 8, including crowd detection, crowd gathering and crowd disperse, which may be detected by modules 801, 802 and 803 respectively of event detection module 108 of FIG. 1. FIG. 9 illustrates an exemplary method of how to define and detect a crowded area. Block 901 illustrates how to define a crowd region event. The user may first select a region of interest on the image (e.g., within the image space). Next, some crowd density threshold may be used to determine how much crowd is of interest. The thresholds may be the number of person within a certain radius of area. Hysteresis thresholds may be used for more robust performance. For example, if we define the crowd density as the number of person inside a 3 meter radius area, one may set two crowd density thresholds: $T_{high}=10$ and $T_{low}=8$. A region may be considered as a crowd region only if the corresponding crowd density is greater or equal than $T_{high}$. A crowd region becomes non-crowd only if the corresponding crowd density becomes less or equal than $T_{low}$. The crowd region may be defined by identified crowd and may change location and/or shape from frame to frame. A centroid of the crowd region may be used to describe the crowd location. The minimum duration threshold may define the minimum time duration a crowd region must keep as crowd before triggering the event detection. For a new video frame input, block 902 looks through all the detected human targets to see if it belongs to a crowd region, then block 903 checks all the crowd regions to update their status. Once detected, crowds and their locations may be tracked frame by frame of the video image. For example, as long as a crowd is detected and continues to meet the minimum threshold $T_{low}$ human models associated with the crowd region may define the crowd within subsequent frames of the video image as long as they remain within an area meeting the minimum crowd density. Additional human models may be added to the detected crowd as they move into the detected crowd region.

Figure 10:
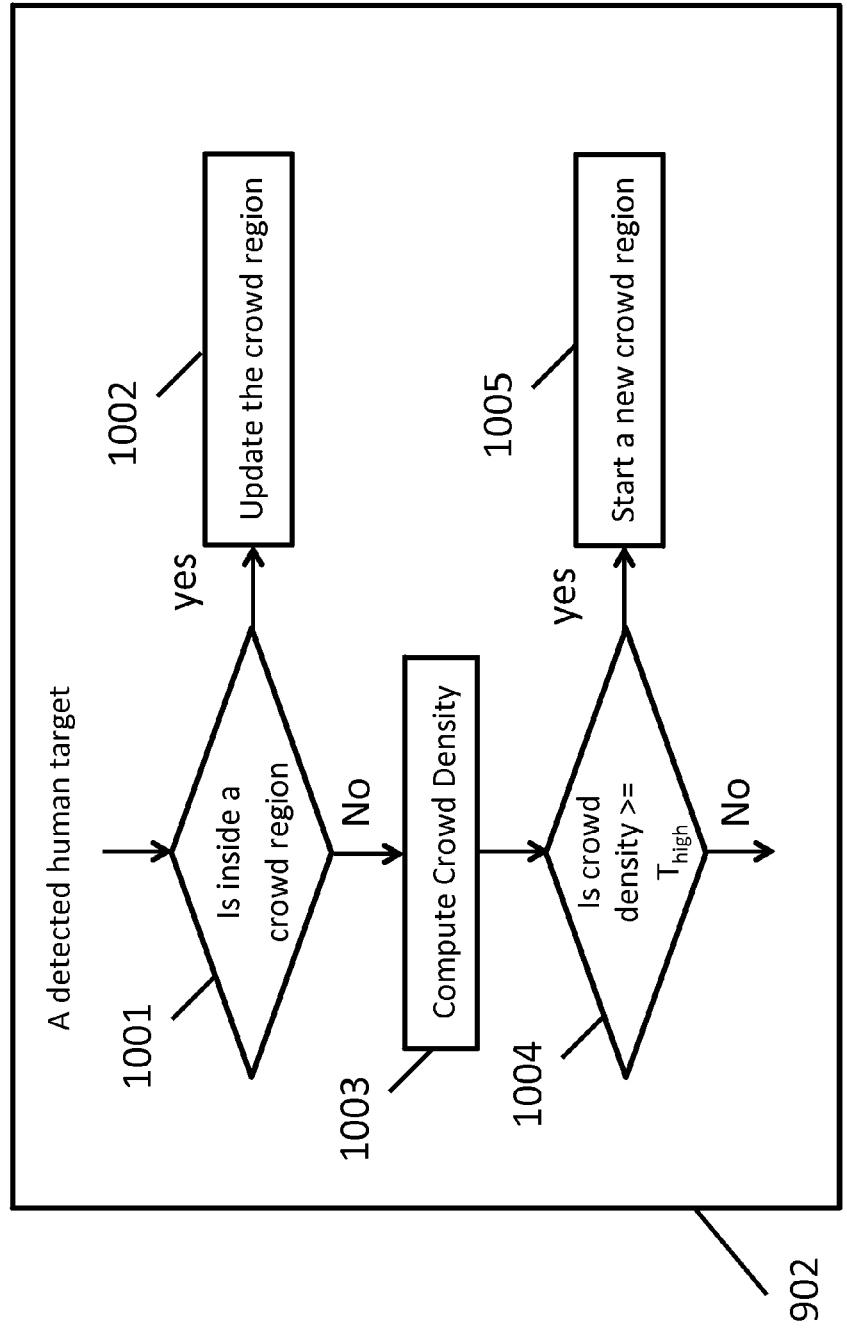
FIG. 10 illustrates an exemplary process on each detected human target.

FIG. 10 illustrates an exemplary process on each detected human target. Block 1001 checks if the current target is inside or near an existing crowd region. If "yes", block 1001 updates the person count for that region. If "no", block 1002 computes the crowd density on the current target's location, then block 1004 checks whether the crowd density measure is greater than or equal to a threshold $T_{high}$. If "yes", a new crowd region is created centered at the current target. If "no", continue to process the next human target.

Figure 11:
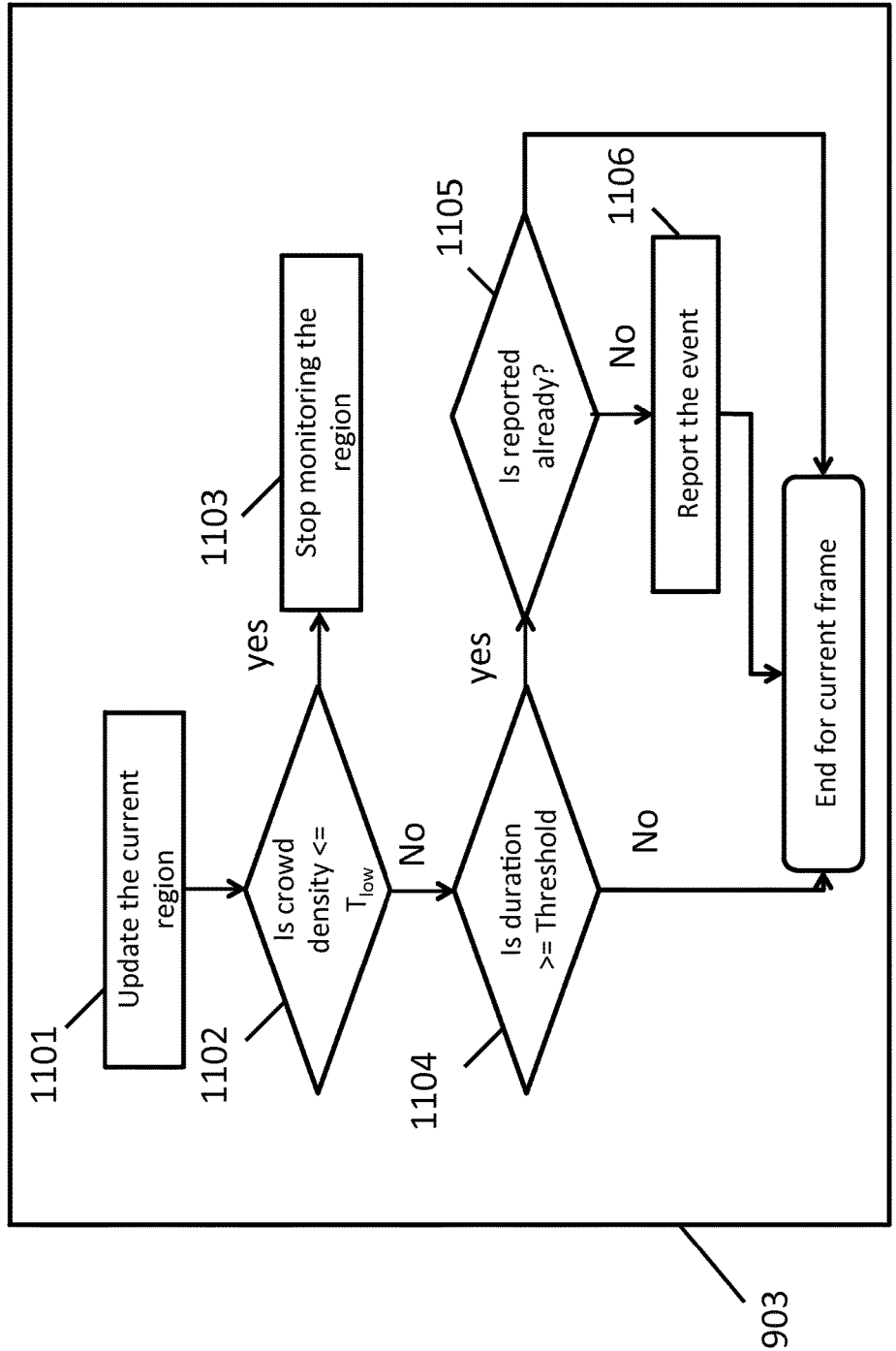
FIG. 11 illustrates an exemplary process on each crowd region.

FIG. 11 illustrates an exemplary process on each crowd region. Block 1101 updates the region area and crowd count based on the target process results; Block 1102 checks if the density count is still greater than a user defined the threshold; if "no", the crowd region is removed from the monitoring list. Block 1104 further checks if the crowd duration of the crowd region under process is longer or equal to a user defined threshold. If "yes", block 1105 further checks if the corresponding crowd event has been reported or not, if not, block 1106 will take an action, such as report the crowd event and mark this crowd region as "reported".

Figure 12:
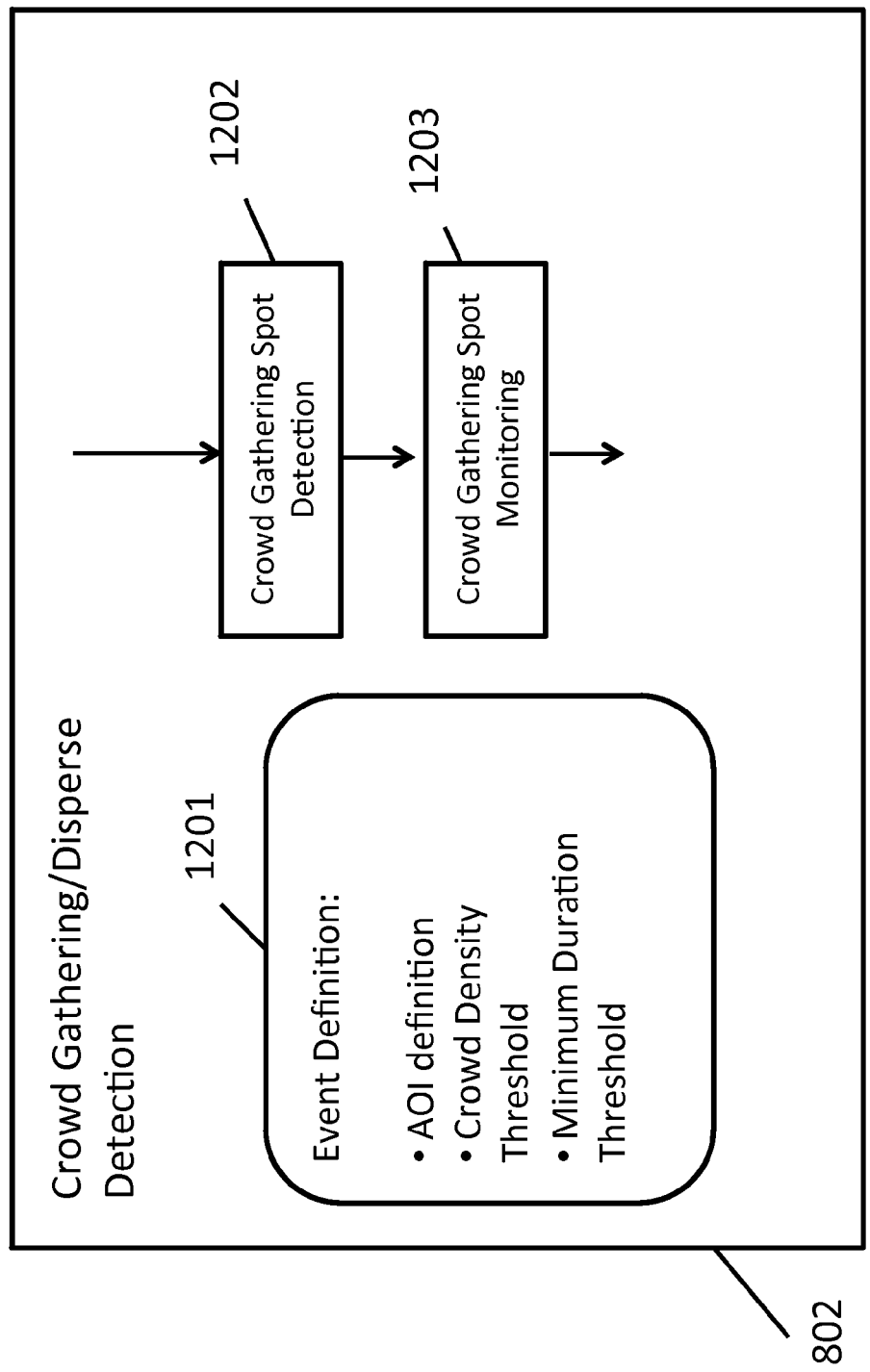
FIG. 12 illustrates a method that may be used to define and detect crowd "gathering" and "disperse" events.

FIG. 12 illustrates a method that may be used to define and detect crowd "gathering" and "disperse" events. Here "gathering" and "disperse" refer to the two processes of forming and ending of a crowd gathering spot. In this example, a crowd gathering spot refers to a region with high local stationary crowd density and is different from a moving crowd such as in a parade. However, the invention is not limited thereto and this method may also be applied to detection of moving crowd gathering spots. Block 1201 illustrates how a crowd gathering spot may be defined. The user may first select a region of interest on the image. Next, some crowd density threshold may be used to determine how much crowd is of interest. The minimum duration threshold may define the minimum time duration a crowd region must keep as crowd to be considered as a valid gathering spot. Block 1202 detects the crowd gathering spots. Block 1203 updates and monitor the detected crowd gathering spots and detects the crowd "gathering" and "disperse" events.

FIG. 13 illustrates one example of defining of a crowd gathering spot. It includes an inner region as indicated by 1301 and an outer region as indicated by 1302. The two regions may be defined by a center point O, a short radius r and a long radius R. In this example, the crowd gathering spot may satisfy the following two criteria:

The crowd density of the inner region must be greater or equal than a predefined threshold;

The person count in the outer region must be smaller (e.g., 2 times, 4 times, 10 times, etc. smaller) than the person count in the inner region. Alternatively, the crowd density in the outer region must be smaller (e.g., 2 times, 4 times, 10 times, etc., smaller) than the crowd density in the inner region.

The above two criteria may indicate that the inner region is a crowd gathering spot, not just a region within a big crowd.

Figure 14B:
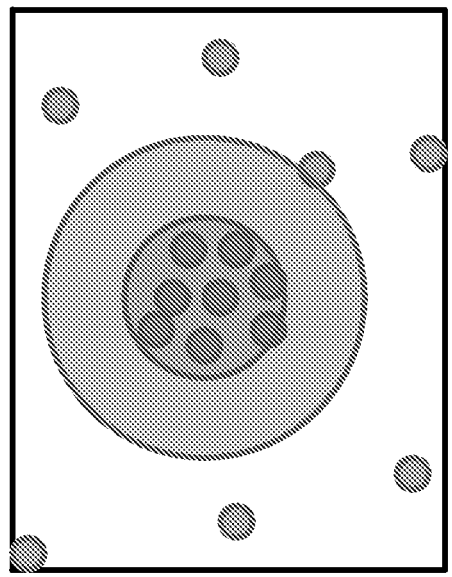
FIGS. 14A and 14B show an example of a crowd gathering spot.
Figure 14A:
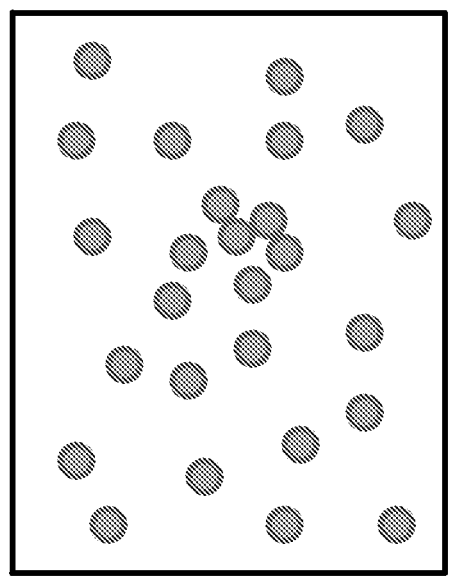

FIGS. 14A and 14B show an example of a crowd gathering spot. FIG. 14A and FIG. 14B each shows a video frame and the detected human targets mapped onto a physical ground plane of the real world. Although FIG. 14A has more human targets, only FIG. 14B contains a crowd gathering spot as defined above.

Figure 15:
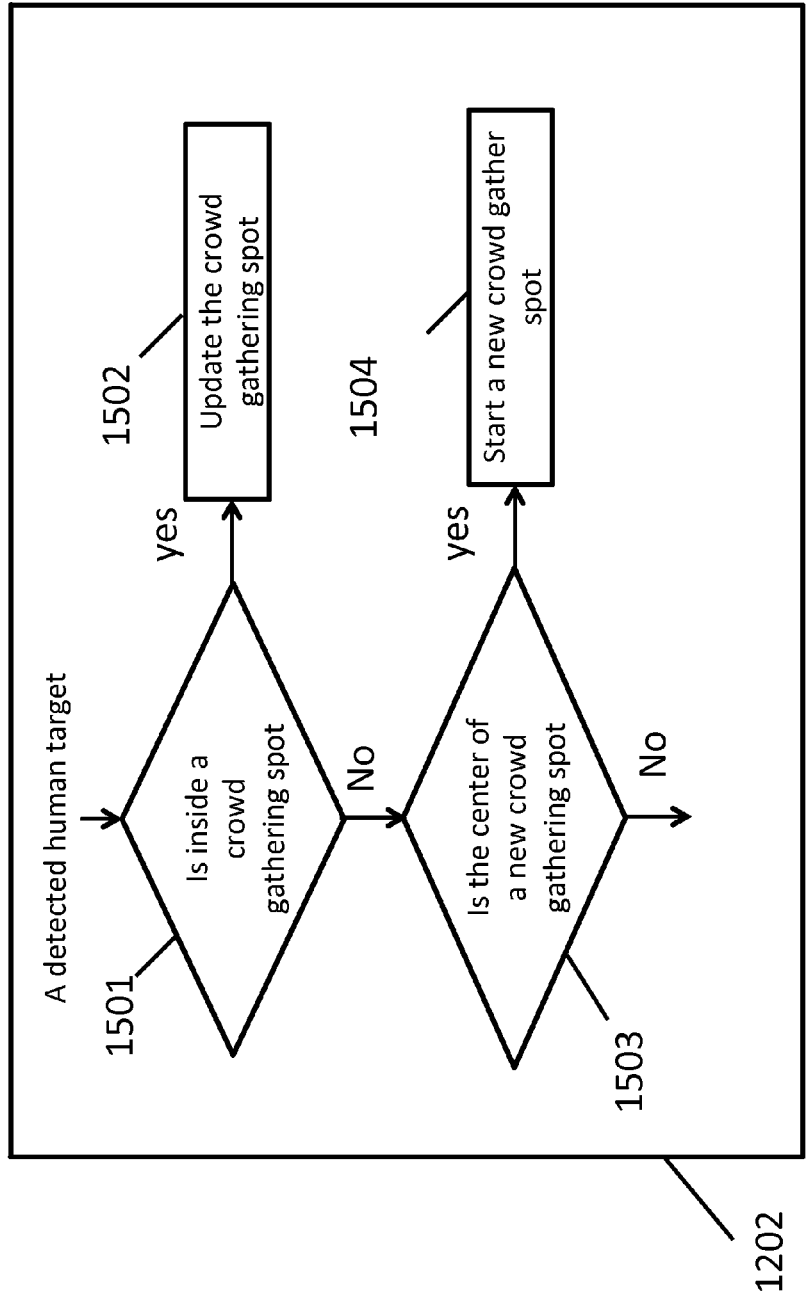
FIG. 15 illustrates an exemplary method of detecting the crowd gathering spots.

FIG. 15 illustrates an exemplary method of detecting the crowd gathering spots. For each detected human target, blocks 1501 checks if it belongs to an existing crowd gathering spot. If "yes", it is used to update the current status of the corresponding crowd gathering spot in block 1502. If "no", block 1503 further checks if the current target is the center of a new crowd gathering spot. If "yes", block 1504 starts a new crowd gathering spot for further monitoring. If "no", the module continues to check the next human detection.

Figure 16:
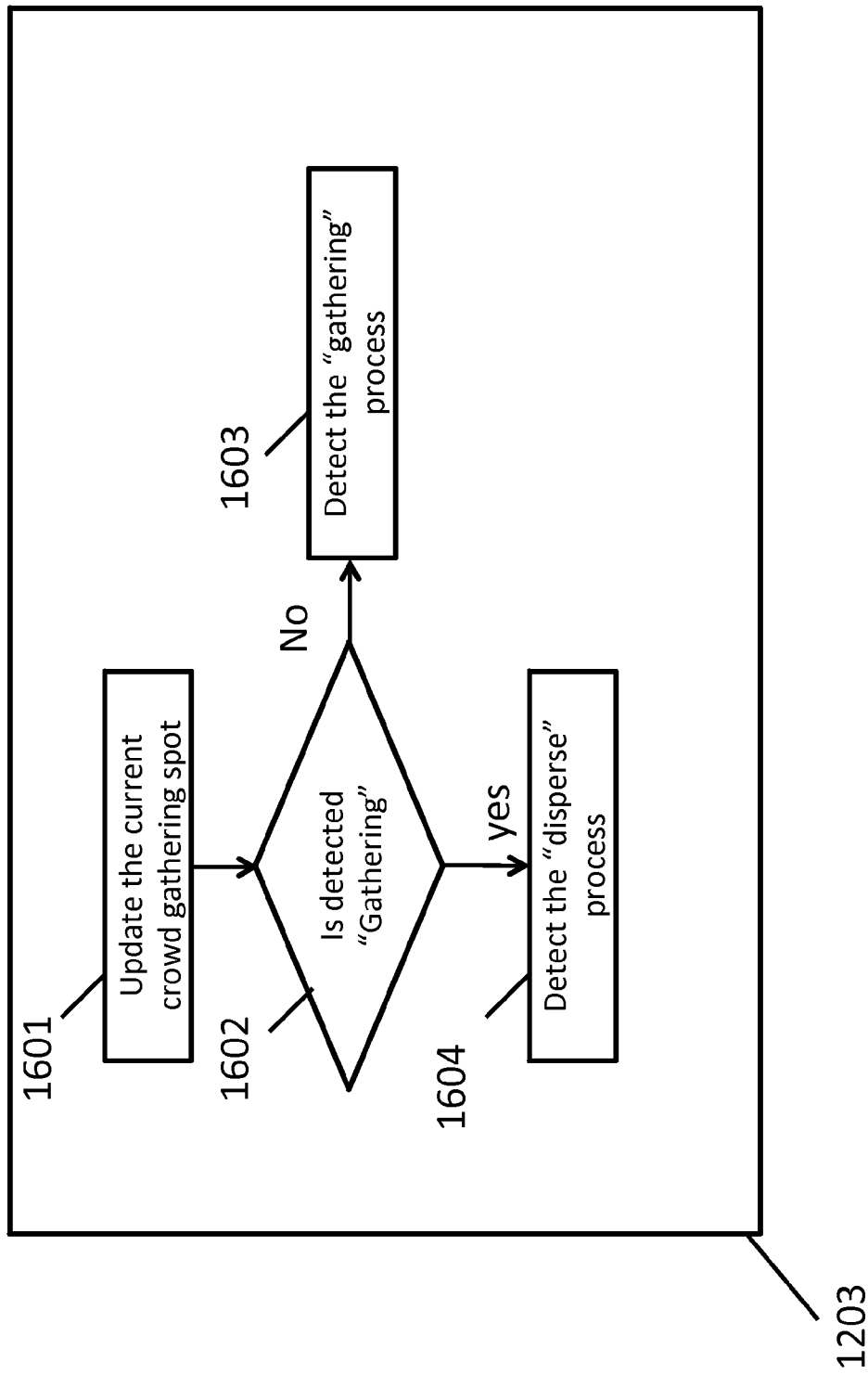
FIG. 16 illustrates an exemplary method of updating the crowd gathering spots and detecting of crowd "gathering" and "disperse" events.

FIG. 16 illustrates an exemplary method of updating the crowd gathering spots and detecting of crowd "gathering" and "disperse" events. Block 1601 updates the location and area of the crowd gathering spot using the new human detection results on the video frame under consideration. Block 1602 checks if the crowd "gathering" event has been detected from the current crowd gathering spot. If "no", block 1603 continues to detect the "gathering" event by checking if a crowd gathering spot has been successfully updated for certain duration. This duration threshold may be set by the user at the rule definition time. Once a crowd gathering spot has generated a "gathering" event, block 1604 further monitor the gathering spot to detect the "disperse" event. Here, a crowd "disperse" event is defined as a crowd gathering spot becomes an empty spot or a spot with low density (e.g., below the minimum crowd density threshold $T_{low}$) within a short period of time. Block 1604 detects two special moments of a crowd gathering spot: the time it becomes not crowded and the time if becomes empty or low. If the time between these two moments is shorter than a user define threshold, a crowd "disperse" event is detected.

Figure 17:
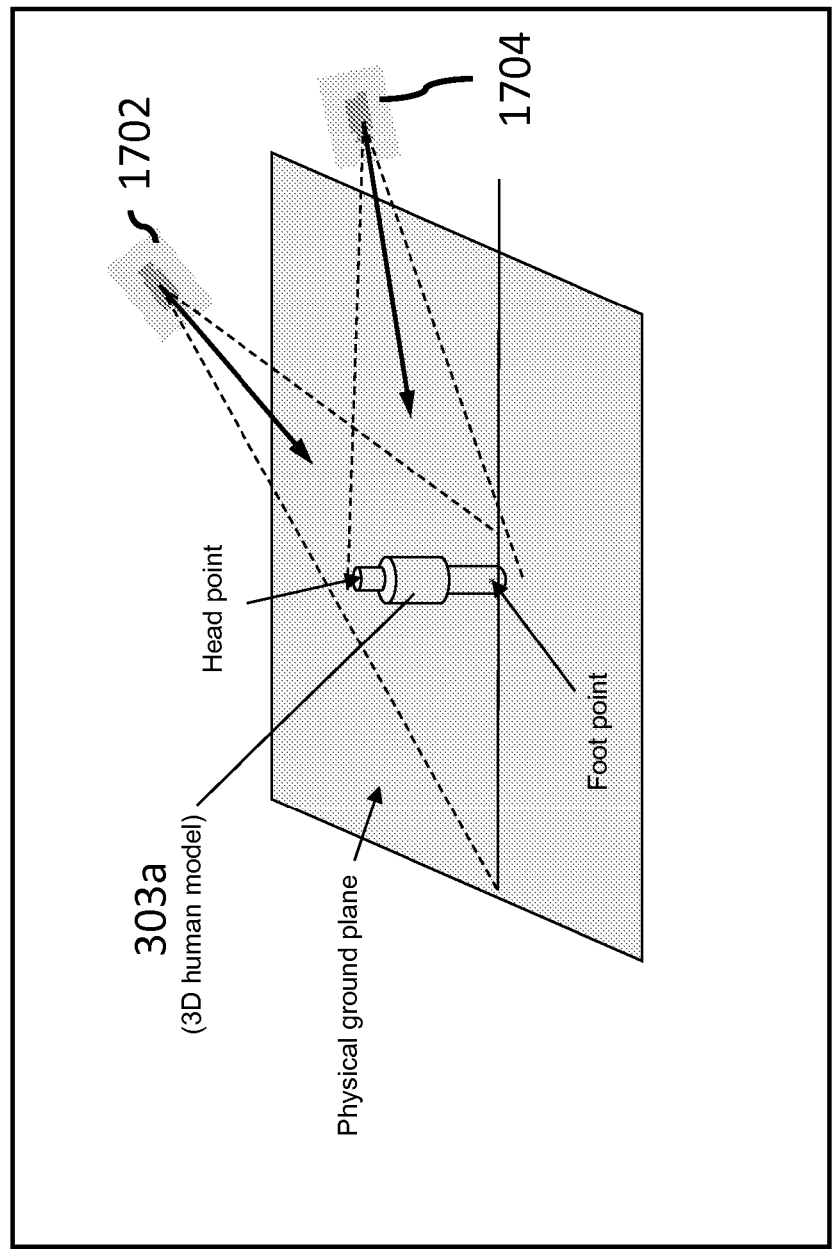
FIG. 17 illustrates an exemplary implementation using plural video cameras.

FIG. 17 illustrates an example of a multi-camera system to which this invention may be applied. In this example, two cameras 1702 and 1704 separately take video images of a scene of interest from different perspectives. The video surveillance system 101 and methods described herein may be the same as described herein for each camera 1702 and 1704 for the change detection module 103, the motion detection module 104, foreground blob detection module 105, generic human model module 303, human-based camera calibration model 304 and human probability map computation module 305—that is, each camera may have their own module or module functionality (if circuitry is shared) for these modules.

The 2D human models to the respective image space provided by human-based camera calibration model 304 of each video camera 1702, 1704, may also be associated with a coordinate of the physical ground plane of the real world. For example, for the human-based camera calibration model module 304 for each camera, an additional entry may be made for a corresponding physical ground plane coordinate to thereby associate each of the N human models with a the same. In calculating a human probability map for each of the cameras 1702, 1704, the probabilities of each probability map may be mapped to the physical ground plane rather than the 2D image space.

In one example, human target estimation module 306, detecting a best number of humans may perform scans of a first probability map of one camera in a manner described above, that is, within the constraints of the search criteria, search for a local maximum of the first probability map. In calculating the criterion function to determine a maximum for the M sets of human models $m(m_1, \ldots m_M)$, the objective is to find:

$$\operatorname*{argmax}_{n \in m} f_1(n) + f_2(n)$$

where n is the particular set of plural 3D human models, which may have identifying coordinates in the physical ground plane to which the probabilities are mapped of each of the two human probability maps. That is, upon selecting a point in the real world as associated with a human model for a model set, the 2D image space human models associated with this point are identified for each camera system, with one human model used to calculate $f_1(n)$ and the other to calculate $f_2(n)$, $f_1(n)$ and $f_2(n)$ may be the same as the functions described herein (respective to the human foreground blob set or human foreground area extracted from the appropriate video image):

$$f(n) = w_R * R(n) + w_P * P(n) - w_O * O(n)$$

where (for the respective n selected 2D human models associated with the video image and the human foreground area of that video image) R is the human recall ratio, which is defined as the percentage of the human foreground area over the entire area of the group of n selected human models; P is the human precision, which is the percentage of the foreground area that is overlapping with the group of n selected human models and O is the human overlap ratio, which is the ratio of the area of overlap of any of the n selected human models with each other to the area occupied by all n selected human models the selected nth human model with areas occupied by the $1^{st}$ to n–1th human models [the areas occupied by human models previously selected in the current pass in calculating f(n)], and $w_R$, $w_P$ and $w_O$ are the weights. It is noted that the weights may differ between functions $f_1(n)$ and $f_2(n)$. Exclusion of pixels for further consideration in selecting the next local maximum may project the 3D human model associated with the ground plane coordinate of the previously selected human model back to each of the two probability maps in the respective image plane.

In a further alternative, a single probability map may be used for multiple cameras. In the example of FIG. 17, probability calculations may be made for each of the 2D video images, as described herein and create two image plane probability maps, each corresponding to the respective 2D image plane. Probabilities of the image plane probability map may be set to zero if they do not exceed a certain threshold (which may be the same or different for each image plane probability map). The identifying coordinates within each image plane probability map may be translated to a ground plane coordinate in the real world for each of the image plane probability maps, creating a ground plane probability map for each video image. The two ground plane probability maps may be merged by multiplying probabilities that share the same ground plane coordinates to create a merged probability map. The merged ground plane probability map may be scanned to find local maximums. Each found local maximum may identify separate human models for each of the video images within their respective image space which may then be used to calculate $f_1(n)$ or $f_2(n)$ (described above) as appropriate. Performing multiple scans of the merged ground plane probability map for plural local maximums may be done to find subsequent human models (one for each of the video images) and to calculate $$f_1(n)+f_2(n)$$

Selection constraints (such as minimum probability threshold and minimum distance within the 3D real world) may be altered and a new scan pass implemented to find the optimum set of m human 3D models (corresponding in this example to 2m 2D human models).

In another example, human target estimation module 306, detecting a best number of humans may perform scans of a first probability map of one camera in a manner described above, that is, within the constraints of the search criteria, search for a local maximum of the first probability map. In calculating the criterion function to determine a maximum for the sets of m human models, the objective is to find a maximum of:

$$\Sigma_{n=1}^{m}=f_1(n)+f_2(n)$$

where n is the identifying coordinate in the physical ground plane to which the probabilities are mapped of each of the two human probability maps. That is, upon selecting a point in the real world, the 2D image space human models associated with this point are identified for each camera system, with one human model used to calculate $f_1(n)$ and the other to calculate $f_2(n)$, $f_1(n)$ and $f_2(n)$ may be the same as the function described above (respective to the human foreground blob set or human foreground area extracted from the appropriate video image):

$$f(n)=w_R*R(n)+w_P*P(n)-w_O*O(n)$$

where R is the human recall ratio, which is defined as the percentage of the human foreground area over the entire area of the selected human models; P is the human precision, which is the percentage of the foreground area that is overlapping with the selected human models and O is the human overlap ratio, which is the overlap of the selected nth human model with areas occupied by the $1^{st}$ to n−1th human models [the areas occupied by human models previously selected in the current pass in calculating $\Sigma f(n)$], and $w_R$, $w_P$ and $w_O$ are the weights. It is noted that the weights may differ between functions $f_1(n)$ and $f_2(n)$. Exclusion of pixels for further consideration in selecting the next local maximum may project the 3D human model associated with the ground plane coordinate of the previously selected human model back to each of the two probability maps in the respective image plane.

In a further alternative, a single probability map may be used for multiple cameras. In the example of FIG. 17, probability calculations may be made for each of the 2D video images, as described herein and create two image plane probability maps, each corresponding to the respective 2D image plane. Probabilities of the image plane probability map may be set to zero if they do not exceed a certain threshold (which may be the same or different for each image plane probability map). The identifying coordinates within each image plane probability map may be translated to a ground plane coordinate in the real world for each of the image plane probability maps, creating a ground plane probability map for each video image. The two ground plane probability maps may be merged by multiplying probabilities that share the same ground plane coordinates to create a merged probability map. The merged ground plane probability map may be scanned to find local maxima. Each found local maximum may identify separate human models for each of the video images within their respective image space which may then be used to calculate $f_1(n)$ or $f_2(n)$ (described above) as appropriate. Performing multiple scans of the merged ground plane probability map for plural local maximums may be done to find subsequent human models (one for each of the video images) and to calculate $$\Sigma_{n=1}^{m}=f_1(n)+f_2(n)$$

Selection constraints (such as minimum probability threshold and minimum distance within the 3D real world) may be altered and a new scan pass implemented to find the optimum set of m human 3D models (corresponding in this example to 2m 2D human models).

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present disclosure. For example, although the disclosure has described the detection of human objects within a video image, the invention should not be considered limited thereto and other objects of interest may also be detected.

What is claimed is:

1. A method of detecting human objects with a video system, comprising:
  obtaining a first video image from a first video camera;
  obtaining a second video image from a second video camera;
  determining pixels of the first video image are first foreground pixels and a group of the first foreground pixels constitute a first foreground blob set of one or more first foreground blobs;
  for each of plural locations within the first video image, comparing a corresponding predetermined shape with the first foreground blob set to obtain a corresponding first probability of a human at the corresponding location, thereby obtaining plural first probabilities associated with the first video image corresponding to the plural locations within the first video image;
  determining pixels of the second video image are second foreground pixels and a group of the second foreground pixels constitute a second foreground blob set of one or more second foreground blobs;
  for each of plural locations within the second video image, comparing a corresponding predetermined shape with the second foreground blob set to obtain a corresponding second probability of a human at the corresponding location, thereby obtaining plural second probabilities associated with the second video image corresponding to the plural locations within the second video image;
  using the plural first probabilities associated with the first video image and the plural second probabilities associated with the second video image, determining X humans are represented by the first foreground blob set and the second foreground blob set, where X is a whole number; and
  providing at least one of a report, an alarm, and an event detection using the determination of the representation of X humans,
  wherein a size of the corresponding predetermined shapes for each of the plural locations within the first video image and each of the plural locations within the second video image is determined in response to calibration of the video system.

2. The method of claim 1, further comprising using the plural probabilities associated with the first video image and the plural probabilities associated with the second video image to determine a location of each of the X humans.

3. The method of claim 2, wherein the determined location of each of the X humans is a location within an image plane corresponding to the first video image.

4. The method of claim 2, wherein the determined location of each of the X humans is a location corresponding to the real world.

5. The method of claim 1, wherein determining first foreground pixels of the first video image comprises comparison of a first frame of the first video image without foreground objects with comparison of a second frame of the first video image containing the foreground objects.

6. The method of claim 1, wherein the predetermined shape is the same for each of the plural locations within the first video image.

7. The method of claim 1, wherein the predetermined shape for at least some of the plural locations within the first video image has a different size.

8. The method of claim 1, wherein the calibration of the video system comprises:
for each of the plural locations within the first video image, determining an image size of a portion of the first video image corresponding to an average human size at the corresponding location to determine the size of each predetermined shape for each of the plural locations within the first video image; and
for each of the plural locations within the second video image, determining an image size of a portion of the second video image corresponding to an average human size at the corresponding location to determine the size of each predetermined shape for each of the plural locations within the second video image.

9. The method of claim 1,
further comprising, prior to the determination of the pixels of the first video image that are first foreground pixels and prior to the determination of the pixels of the second video image that are second foreground pixels, for each of the plural locations within the first video image and for each of the plural locations within the second video image, determining the corresponding predetermined shape by estimating a foreground image part to be occupied in the corresponding video image when a human exists at the corresponding location.

10. The method of claim 9, wherein estimating the foreground image part for each of the plural locations within the first video image and for each of the plural locations within the second video image is based on a projection of a model of a human in the real world onto an image plane of the corresponding video image.

11. The method of claim 1, wherein each of the first video image and second video image comprises a plurality of image frames, each image frame comprising a two dimensional image having the corresponding plural locations, each of the corresponding plural locations identified by a corresponding x, y coordinate pair within the corresponding two dimensional image.

12. The method of claim 11, wherein each of the plural locations within the first video image and each of the plural locations within the second video image is associated with the corresponding predetermined shape with respect to an image plane of the corresponding video image.

13. The method of claim 1, further comprising, for each of the plural locations within the first video image and for each of the plural locations within the second video image, calculating a recall ratio of the corresponding predetermined shape and the corresponding foreground blob set to determine the associated corresponding probability.

14. The method of claim 13, wherein for each of the plural locations within the first video image and for each of the plural locations within the second video image, calculating the recall ratio comprises determining a ratio of (a) an area comprising an overlap of an area occupied by the corresponding predetermined shape and the corresponding foreground blob set and (b) an area of the corresponding foreground blob set.

15. The method of claim 1, further comprising:
creating a probability map comprising plural third probabilities using the plural first probabilities associated with the first video image and the plural second probabilities associated with the second video image; and
determining local maximums of probabilities of the probability map.

16. The method of claim 15, further comprising:
selecting a first subset of the plural predetermined shapes based on the third probabilities and selecting a second subset of the plural predetermined shapes based on the third probabilities; and
analyzing an overlap of an area occupied by the selected first subset of the plural predetermined shapes and an area occupied by the first foreground blob set; and
analyzing an overlap of an area occupied by the selected second subset of the plural predetermined shapes and an area occupied by the second foreground blob set.

17. The method of claim 15, further comprising determining each of the plural third probabilities by associating a corresponding one of the first probabilities with a corresponding one of the second probabilities.

18. The method of claim 15, wherein each of the plural third probabilities of the probability map are associated with a corresponding real world location.

19. The method of claim 18, further comprising:
selecting a first real world location associated with one of the third probabilities corresponding to a local maximum of the probability map;
obtaining a first predetermined shape and a second predetermined shape that each correspond to the selected first real world location.

20. The method of claim 19, further comprising:
analyzing an amount of an overlap of an area occupied by the first predetermined shape and the first foreground blob set; and
analyzing an amount of an overlap of an area occupied by the second predetermined shape and the second foreground blob set.

21. The method of claim 19, further comprising:
calculating a first ratio of (a) an area comprising an overlap of an area occupied by the first predetermined shape and the first foreground blob set and (b) an area of the first foreground blob set,
wherein the first ratio is to determine that X humans are represented by the first foreground blob set.

22. The method of claim 18, further comprising calculating a precision value and a recall value for each of m locations of the real world locations corresponding to the plural third probabilities, m being an integer, each of the m locations corresponding to a local maximum of the probability map.

23. The method of claim 22, wherein each of the m locations are selected sequentially 1 to m, a selection of an (m−1)th location excluding selection of an mth location that falls within a first predetermined distance of the (m−1)th location.

24. The method of claim 23, wherein each of the m locations are selected sequentially 1 to m wherein the selection of a next location of the m locations comprises selecting a location based upon a bottom edge of at least one of the first video image and the second video image for those locations corresponding to a local maximum that have not been excluded.

25. The method of claim 18, further comprising, for each of the real word locations corresponding to the plural third probabilities, associating one of the first probabilities and one of the second probabilities to obtain the corresponding third probability.

26. The method of claim 25, wherein each of the third probabilities of the probability map are determined based on a mathematical product of one of the first probabilities and one of the second probabilities.

27. The method of claim 15, wherein each of the third probabilities of the probability map is determined based on a mathematical product of one of the first probabilities and one of the second probabilities.

28. A method of detecting human objects with a video system, comprising:
obtaining a first video image from a first video camera;
obtaining a second video image from a second video camera;
determining pixels of the first video image are first foreground pixels and a group of the first foreground pixels constitute a first foreground blob set of one or more first foreground blobs;
determining pixels of the second video image are second foreground pixels and a group of the second foreground pixels constitute a second foreground blob set of one or more second foreground blobs;
for each of plural locations within the first video image, comparing a corresponding predetermined shape with the first foreground blob set and for each of plural locations within the second video image, comparing a corresponding predetermined shape with the second foreground blob set, to determine X humans are represented by the first foreground blob set and the second foreground blob set, where X is whole number, and to determine a location of each of the X humans within the real world; and
providing at least one of a report, an alarm, and an event detection using the determination of the representation of X humans,
wherein a size of the corresponding predetermined shapes for each of the plural locations within the first video image and each of the plural locations within the second video image is determined in response to calibration of the video system.

29. The method of claim 28, further comprising detecting the existence of a crowd by reviewing at least some of the locations of the X humans.

30. The method of claim 28, further comprising determining an existence of a crowd when it is determined that Y of the X humans are located within a first area of a horizontal plane of the real world.

31. The method of claim 30, wherein the first area comprises a predetermined geometric shape having a predetermined area size within the real world.

32. The method of claim 30, wherein the first area comprises an area defined by a circle.

33. The method of claim 30, further comprising determining a crowd density within the first area.

34. The method of claim 33, further comprising comparing the crowd density to a threshold and providing at least one of the report and the alarm when the crowd density exceeds the threshold.

35. The method of claim 28, further comprising:
determining a first crowd density within a first area corresponding to a first time;
determining a second crowd density within the first area corresponding to a second time; and
determining a crowd gathering event in response to the first crowd density and the second crowd density.

36. The method of claim 28, further comprising:
determining a first crowd density within a first area corresponding to a first time;
determining a second crowd density within the first area corresponding to a second time; and
determining a crowd dispersing event in response to the first crowd density and the second crowd density.

37. A video surveillance system, comprising:
a first video source configured to provide a first video image of a real world scene;
a second video source configured to provide a second video image of the real world scene;
a foreground detection module configured to detect first foreground pixels of the first video image, a group of the first foreground pixels constituting a first foreground blob set of one or more first foreground blobs, second foreground pixels of the second video image, and a group of the second foreground pixels constituting a second foreground blob set of one or more second foreground blobs;
a human detection module configured determine X humans are represented by the first foreground blob set and the second foreground blob set by, for each of plural locations within the first video image, comparing a corresponding predetermined shape with the first foreground blob set and for each of plural locations within the second video image, comparing a corresponding predetermined shape with the second foreground blob set; and
a response module configured to provide at least one of a report, an alarm, and an event detection using the determined representation of X humans,
wherein the human detection module is configured to associate the plural locations within the first video image with corresponding ones of the plural locations within the second video image based upon determining real world locations that correspond to the plural locations within the first video image and the plural locations within the second video image.

38. The video surveillance system of claim 37, wherein the human detection module is configured to determine X humans are represented by the first foreground blob set and the second foreground blob set by, for each of the plural locations within the first video image, analyzing an amount of an overlapping area of the corresponding predetermined shape with the first foreground blob set and for each of the plural locations within the second video image, analyzing an amount of an overlapping area of the corresponding predetermined shape with the second foreground blob set.

* * * * *